United States Patent
Carter et al.

(10) Patent No.: US 10,315,147 B2
(45) Date of Patent: Jun. 11, 2019

(54) FILTER CARTRIDGES; AIR CLEANER ASSEMBLIES; HOUSINGS; FEATURES; COMPONENTS; AND, METHODS

(71) Applicant: Donaldson Company, Inc., Minneapolis, MN (US)

(72) Inventors: Steven A. Carter, Eagan, MN (US); Stephen M. Martin, White Bear Lake, MN (US); Gert Proost, Kessel-lo (BE)

(73) Assignee: Donaldson Company, Inc., Minneapolis, MN (US)

( * ) Notice: Subject to any disclaimer, the term of this patent is extended or adjusted under 35 U.S.C. 154(b) by 136 days.

(21) Appl. No.: 15/508,043

(22) PCT Filed: Sep. 15, 2015

(86) PCT No.: PCT/US2015/050223
§ 371 (c)(1),
(2) Date: Mar. 1, 2017

(87) PCT Pub. No.: WO2016/044293
PCT Pub. Date: Mar. 24, 2016

(65) Prior Publication Data
US 2017/0266601 A1    Sep. 21, 2017

Related U.S. Application Data

(60) Provisional application No. 62/050,705, filed on Sep. 15, 2014.

(51) Int. Cl.
*B01D 46/00*    (2006.01)
*B01D 46/10*    (2006.01)
(Continued)

(52) U.S. Cl.
CPC ....... *B01D 46/103* (2013.01); *B01D 46/0015* (2013.01); *B01D 46/0041* (2013.01);
(Continued)

(58) Field of Classification Search
CPC .............. B01D 46/103; B01D 46/0015; B01D 46/0041; B01D 46/0045; B01D 46/2411;
(Continued)

(56) References Cited

U.S. PATENT DOCUMENTS 4,861,359 A    8/1989    Tettman
4,925,561 A    5/1990    Ishii et al.
(Continued)

FOREIGN PATENT DOCUMENTS

DE    2630875 A1    1/1978
DE    8708814 U1    9/1987
(Continued)

OTHER PUBLICATIONS

International Search Report and Written Opinion for PCT/US2015/050223 dated Dec. 23, 2015.

*Primary Examiner* — Robert Clemente
(74) *Attorney, Agent, or Firm* — Merchant & Gould P.C.

(57) ABSTRACT

According to the present disclosure, features, components and techniques useable for providing air cleaner arrangements are provided. Many of the features relate to an axial seal arrangement provided on a filter cartridge. A typical filter cartridge, for use with these features, is a filter cartridge having opposite flow ends. Example media arrangements that fit this characterization are described. Seal arrangements provided with an axial housing sealing engagement surface are shown. A seal arrangement is provided. Also, air cleaner assemblies having advantageous features therein are provided. Further, air cleaner housings are described, with selected, preferred features for engagement with filter cartridges.

28 Claims, 27 Drawing Sheets

(51) Int. Cl.
  *B01D 46/52* (2006.01)
  *B01D 46/24* (2006.01)

(52) U.S. Cl.
  CPC ...... *B01D 46/0045* (2013.01); *B01D 46/2411* (2013.01); *B01D 46/525* (2013.01); *B01D 2271/02* (2013.01); *B01D 2271/022* (2013.01); *B01D 2271/025* (2013.01)

(58) Field of Classification Search
  CPC ............... B01D 46/525; B01D 46/527; B01D 2271/02; B01D 2271/022; B01D 2271/025
  See application file for complete search history.

(56) References Cited

U.S. PATENT DOCUMENTS

| | | | |
|---|---|---|---|
| 5,049,326 A | 9/1991 | Matsumoto et al. | |
| 5,106,397 A | 4/1992 | Jaroszczyk | |
| 5,562,825 A | 10/1996 | Yamada et al. | |
| 5,613,992 A | 3/1997 | Engel | |
| 5,772,883 A | 6/1998 | Rothman et al. | |
| D396,098 S | 7/1998 | Gillingham et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,895,574 A | 4/1999 | Friedmann et al. | |
| 5,902,364 A | 5/1999 | Tokar et al. | |
| 6,039,778 A | 3/2000 | Coulonvaux | |
| D428,128 S | 7/2000 | Gillingham et al. | |
| 6,179,890 B1 | 1/2001 | Ramos et al. | |
| D437,401 S | 2/2001 | Ramos et al. | |
| 6,190,432 B1 | 2/2001 | Gieseke et al. | |
| 6,210,469 B1 | 4/2001 | Tokar | |
| 6,235,195 B1 | 5/2001 | Tokar | |
| 6,263,850 B1 | 7/2001 | Winmill et al. | |
| 6,350,296 B1 | 2/2002 | Warner | |
| 6,568,540 B1 | 5/2003 | Holzmann et al. | |
| 6,610,126 B2 | 8/2003 | Xu et al. | |
| 6,673,136 B2 | 1/2004 | Gillingham et al. | |
| 6,966,940 B2 | 11/2005 | Krisko et al. | |
| 7,252,704 B2 | 8/2007 | Tokar et al. | |
| 7,318,851 B2 | 1/2008 | Brown et al. | |
| 7,351,270 B2 | 4/2008 | Engelland et al. | |
| 7,481,863 B2 | 1/2009 | Oelpke et al. | |
| 7,625,419 B2 | 12/2009 | Nelson et al. | |
| 7,645,310 B2 | 1/2010 | Krisko et al. | |
| 7,708,796 B2 | 5/2010 | Rieger et al. | |
| 7,892,307 B2 | 2/2011 | Freisinger et al. | |
| 7,931,725 B2 | 4/2011 | Wydeven et al. | |
| 7,959,701 B2 | 6/2011 | Merritt | |
| 7,993,442 B2 | 8/2011 | Crews et al. | |
| 8,002,869 B2 | 8/2011 | Nepsund et al. | |
| 8,048,187 B2 | 11/2011 | Merritt et al. | |
| 8,163,057 B2 | 4/2012 | Blossey et al. | |
| 8,177,877 B2 | 5/2012 | Merritt et al. | |
| 8,182,570 B2 | 5/2012 | Rieger | |
| 8,206,625 B2 | 6/2012 | Brown et al. | |
| 8,226,786 B2 | 7/2012 | Schrage et al. | |
| 8,246,702 B2 | 8/2012 | Ackermann et al. | |
| 8,277,531 B2 | 10/2012 | Brown et al. | |
| 8,328,897 B2 | 12/2012 | Nelson et al. | |
| 8,506,668 B2 | 8/2013 | Swanson et al. | |
| 8,540,790 B2 | 9/2013 | Brown et al. | |
| 8,551,207 B2 | 10/2013 | Swanson et al. | |
| 8,551,375 B2 | 10/2013 | Brown et al. | |
| 9,242,197 B2 | 1/2016 | Croissant et al. | |
| 2004/0187689 A1 | 9/2004 | Sporre et al. | |
| 2005/0130508 A1 | 6/2005 | Yeh | |
| 2006/0090434 A1* | 5/2006 | Brown | B01D 46/527 55/498 |
| 2008/0276582 A1 | 11/2008 | Boehrs et al. | |
| 2008/0282890 A1 | 11/2008 | Rocklitz et al. | |
| 2008/0307759 A1 | 12/2008 | Reichter et al. | |
| 2009/0127211 A1 | 5/2009 | Rocklitz et al. | |
| 2010/0032365 A1 | 2/2010 | Moe et al. | |
| 2016/0108866 A1 | 4/2016 | Dewit et al. | |
| 2016/0177891 A1 | 6/2016 | Yadav et al. | |

FOREIGN PATENT DOCUMENTS

| | | |
|---|---|---|
| DE | 3705951 C1 | 3/1988 |
| DE | 29613098 U1 | 10/1996 |
| DE | 19709834 A1 | 11/1997 |
| DE | 29714886 U1 | 11/1997 |
| DE | 10328002 A1 | 1/2005 |
| DE | 20 2008 017 059 U1 | 5/2010 |
| EP | 0534079 A2 | 3/1993 |
| EP | 0861671 A2 | 9/1998 |
| EP | 0900118 A1 | 3/1999 |
| EP | 1679436 A1 | 7/2006 |
| EP | 1649920 B1 | 11/2007 |
| EP | 2140922 A2 | 1/2010 |
| EP | 2024631 B1 | 3/2011 |
| EP | 2027908 B1 | 11/2011 |
| FR | 1563990 A | 4/1969 |
| JP | 2003-161216 A | 6/2003 |
| WO | WO 88/03432 | 5/1988 |
| WO | WO 97/40908 A1 | 11/1997 |
| WO | WO 97/40918 A1 | 11/1997 |
| WO | WO 99/33544 A | 7/1999 |
| WO | WO 02/31340 A1 | 4/2002 |
| WO | WO 03/47722 A2 | 6/2003 |
| WO | WO 2004/007054 A1 | 1/2004 |
| WO | WO 2004/082795 A2 | 9/2004 |
| WO | WO 2005/040593 A1 | 5/2005 |
| WO | WO 2005/046841 A1 | 5/2005 |
| WO | WO 2005/077487 A1 | 8/2005 |
| WO | WO 2011/015489 A1 | 2/2011 |
| WO | WO 2011/115973 A2 | 9/2011 |
| WO | WO 2013/104791 A1 | 7/2013 |
| WO | WO 2016/044293 A1 | 3/2016 |
| WO | WO 2016/105560 A3 | 6/2016 |

* cited by examiner

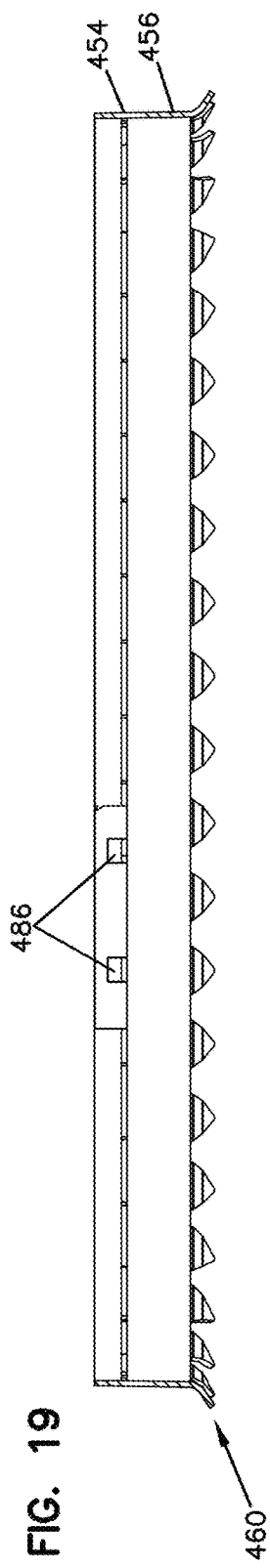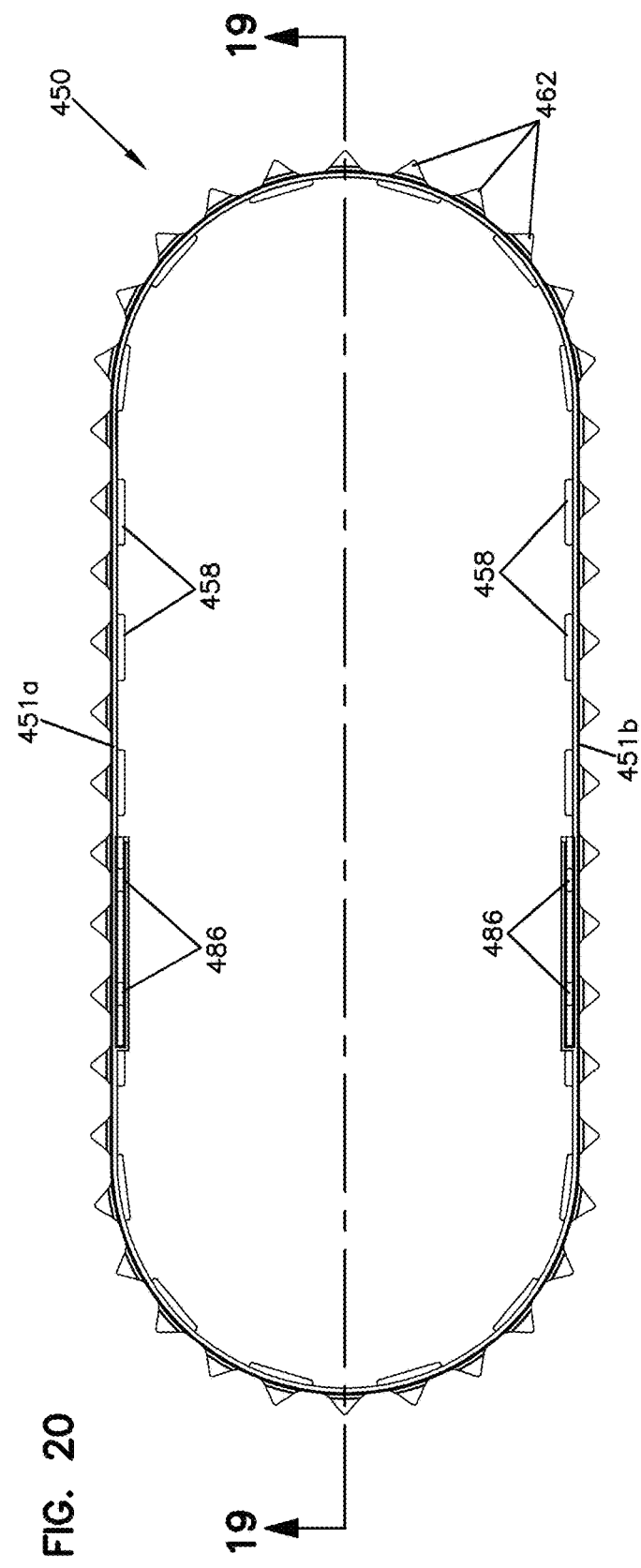

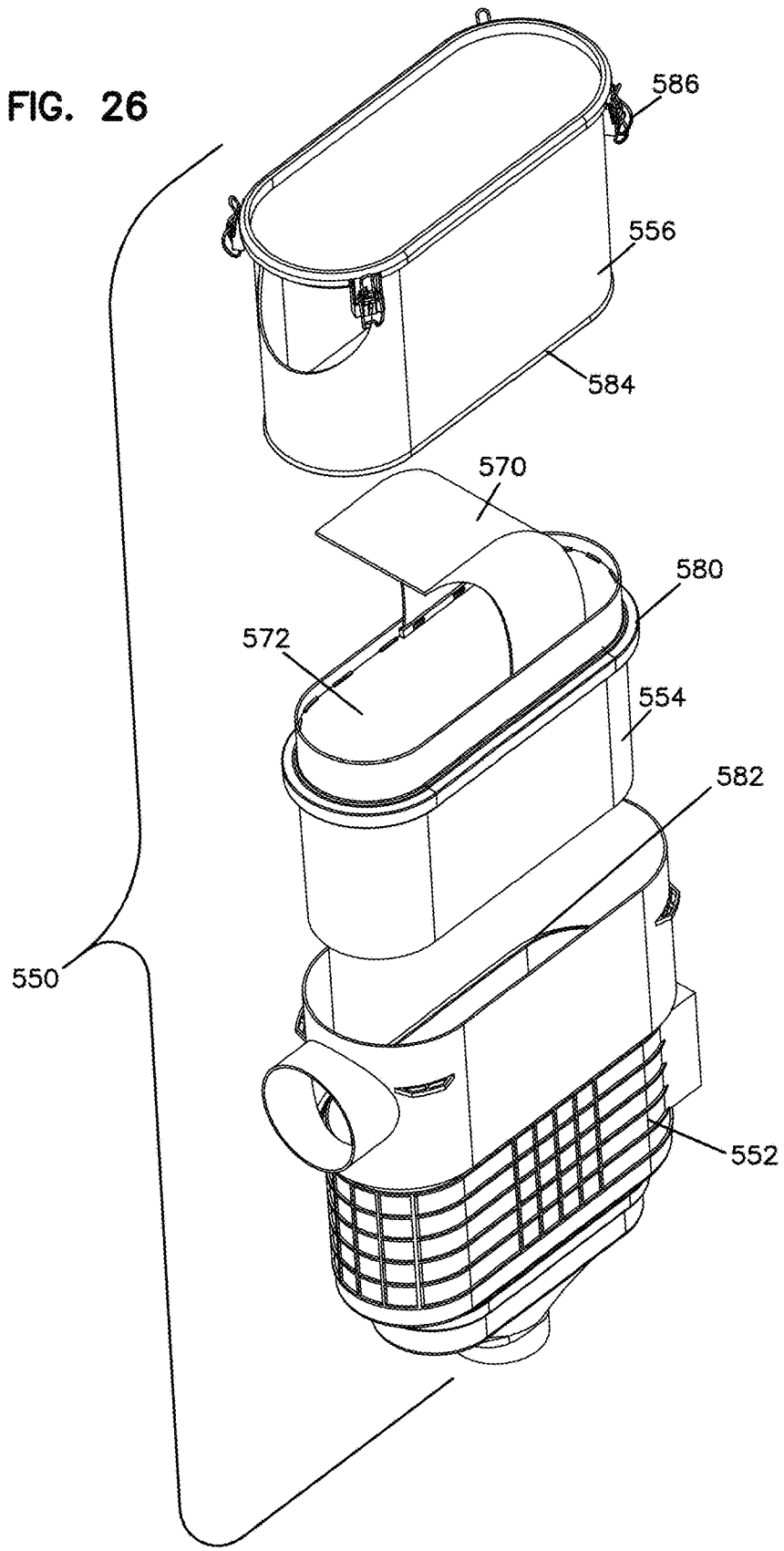

US 10,315,147 B2

FILTER CARTRIDGES; AIR CLEANER ASSEMBLIES; HOUSINGS; FEATURES; COMPONENTS; AND, METHODS

This application is a US National Stage application of PCT International Patent application No. PCT/US2015/050223, filed Sep. 15, 2015, which claims priority to U.S. Provisional patent application Ser. No. 62/050,705, filed Sep. 15, 2014, which applications are incorporated herein by reference. To the extent appropriate, a claim of priority is made to each of the above disclosed applications.

FIELD OF THE DISCLOSURE

The present disclosure relates to filter arrangements for use in filtering air. The disclosure particularly relates to filter arrangements having opposite flow ends. More specifically, the disclosure relates to such use of such filter arrangements and their inclusion in serviceable air filter cartridges for use in air cleaners. Air cleaner arrangements and methods of assembly and use are also described.

BACKGROUND

Air streams can carry contaminant material therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

According to the present disclosure, features, components and techniques useable for providing filter assemblies, such as air cleaner arrangements, are provided. Many of the features relate to a pinch arrangement having an axial seal surface provided on a filter cartridge. A typical filter cartridge, for use with these features, is a filter cartridge having opposite flow ends with media positioned to filter fluid flow in a direction between the opposite flow ends. Example media arrangements that fit this characterization are described.

According to the present disclosure, the seal arrangements are provided with one or more axial housing seal engagement surfaces.

Also according to the present disclosure, air cleaner assemblies having advantageous features therein are provided. Further, air cleaner housings are described, with selected, preferred, features for engagement with filter cartridges.

There is no specific requirement that an air cleaner assembly, component or feature include all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 19 is a sectional view of the ring arrangement of FIG. 18.

FIG. 20 is a top view of the ring arrangement of FIG. 18.

FIG. 26 is an exploded view of the air cleaner of FIG. 25.

DETAILED DESCRIPTION

I. Example Media Configurations, Generally

A. Media Pack Arrangements Using Filter Media Having Media Ridges (Flutes) Secured to Facing Media Fluted filter media (media having media ridges) can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet, and, (2) a facing media sheet. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

Figure 11:
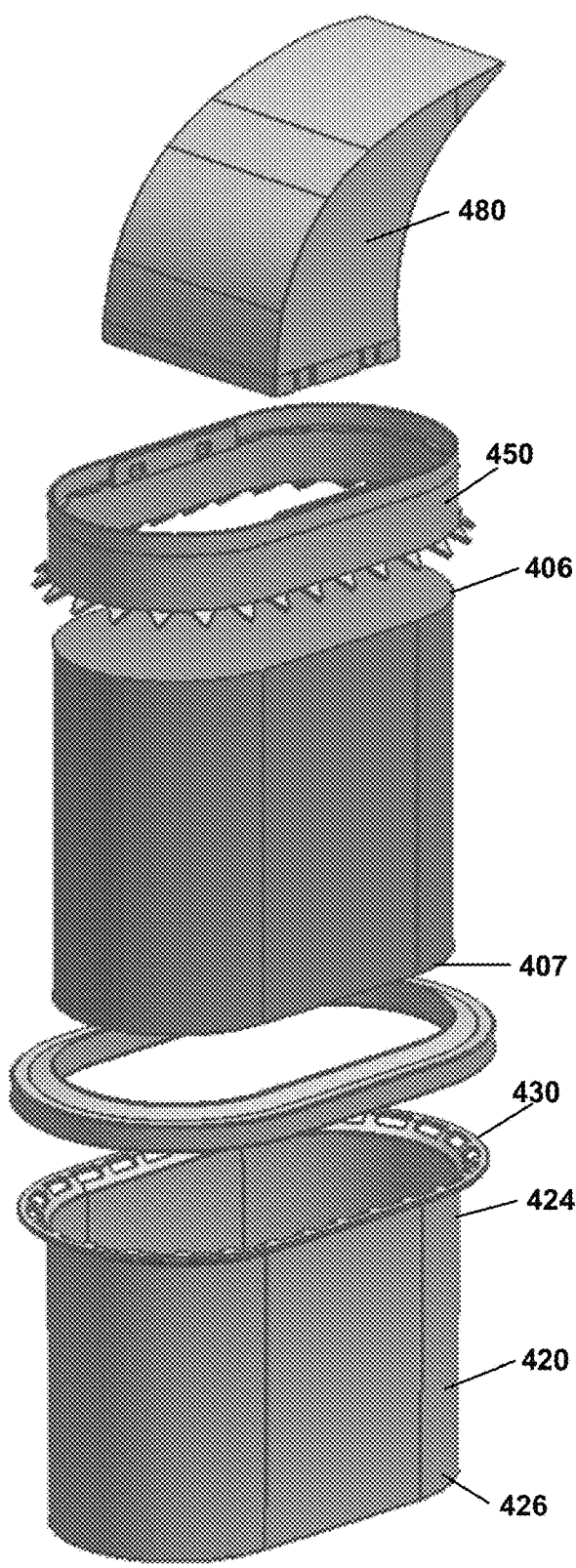
FIG. 11 is an exploded perspective view of the filter cartridge of FIGS. 9 and 10.
Figure 12:
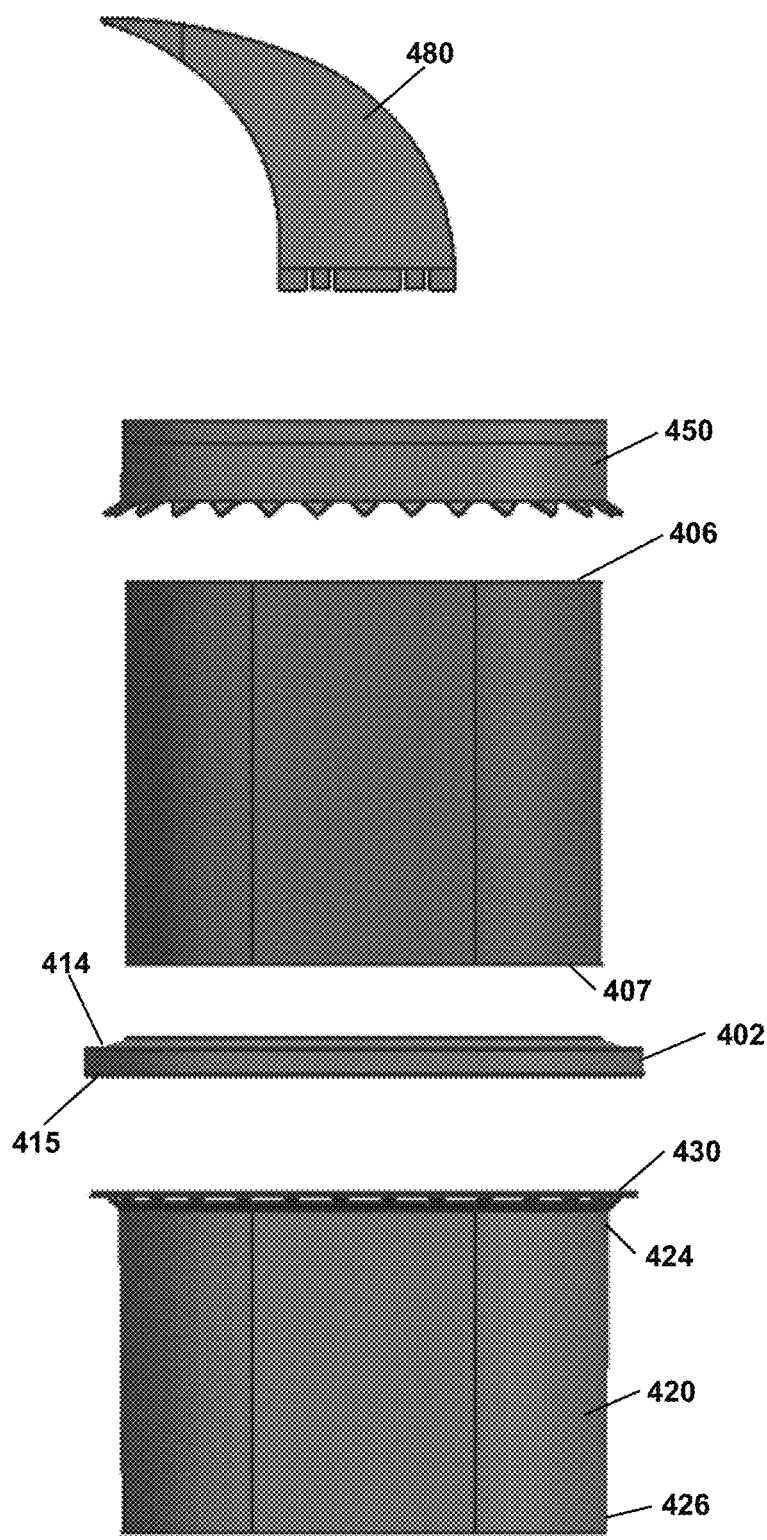
FIG. 12 is an exploded side view of the filter cartridge of FIGS. 9 and 10.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause corrugations in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media (media having media ridges) secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

Figure 1:
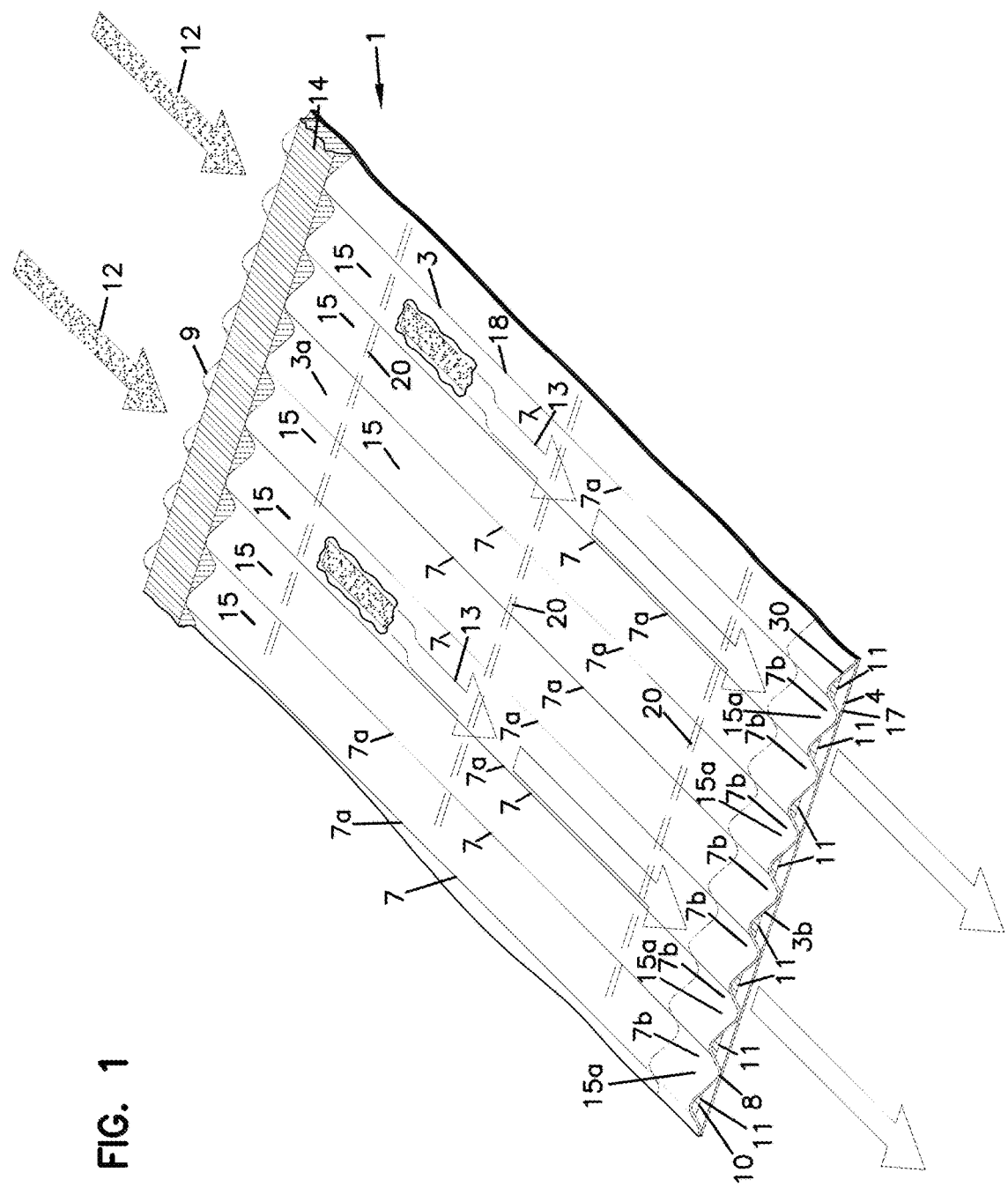
FIG. 1 is a fragmentary, schematic, perspective view of a first example media type useable in arrangements according to the present disclosure.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

In general, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight. By "straight" in this context, it is meant that through at least 70%, typically at least 80% of the length between edges 8 and 9, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

Adjacent edge 8 is provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

Adjacent edge 9, is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.")

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be which D2 is about 1.4-1.6 times D1. Herein the ratio D2/D1 will sometimes be characterized as the flute/flat ratio or media draw for the corrugated media.

Figure 3:
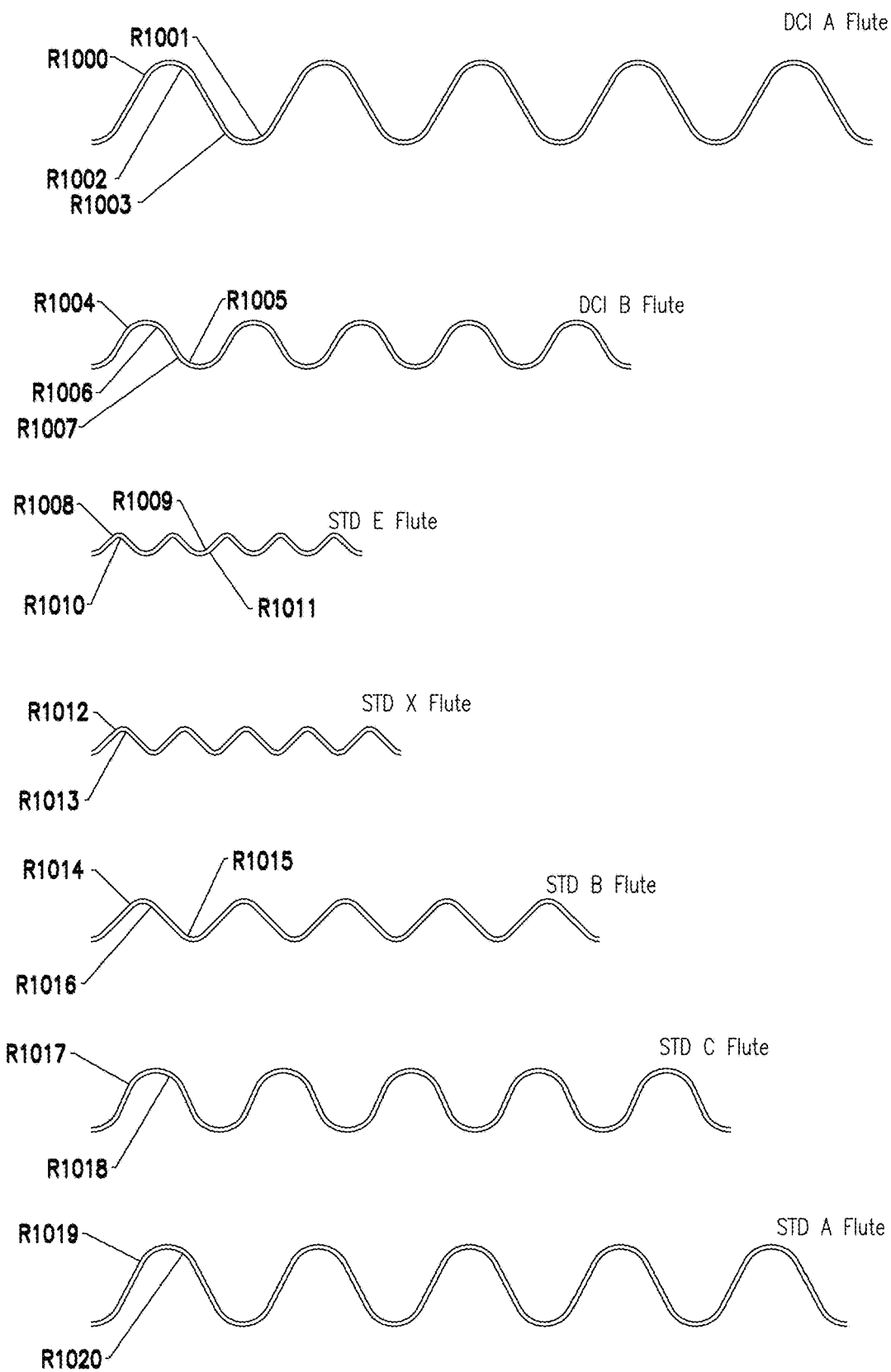
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm); R1001 = .0581 inch (1.476 mm);<br>R1002 = .0575 inch (1.461 mm); R1003 = .0681 inch (1.730 mm); |
| DCI B Flute: | Flute/flat = 1.32:1; The Radii (R) are as follows:<br>R1004 = .0600 inch (1.524 mm); R1005 = .0520 inch (1.321 mm);<br>R1006 = .0500 inch (1.270 mm); R1007 = .0620 inch (1.575 mm); |
| Std. E Flute: | Flute/flat = 1.24:1; The Radii (R) are as follows:<br>R1008 = .0200 inch (.508 mm); R1009 = .0300 inch (.762 mm);<br>R1010 = .0100 inch (.254 mm); R1011 = .0400 inch (1.016 mm); |
| Std. X Flute: | Flute/flat = 1.29:1; The Radii (R) are as follows:<br>R1012 = .0250 inch (.635 mm); R1013 = .0150 inch (.381 mm); |
| Std. B Flute: | Flute/flat = 1.29:1; The Radii (R) are as follows:<br>R1014 = .0410 inch (1.041 mm); R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm); R1018 = .0620 inch (1.575 mm); |
| Std. A Flute: | Flute/flat = 1.53:1; The Radii (R) are as follows:<br>R1019 = .0720 inch (1.829 mm); R1020 = .0620 inch (1.575 mm). | desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
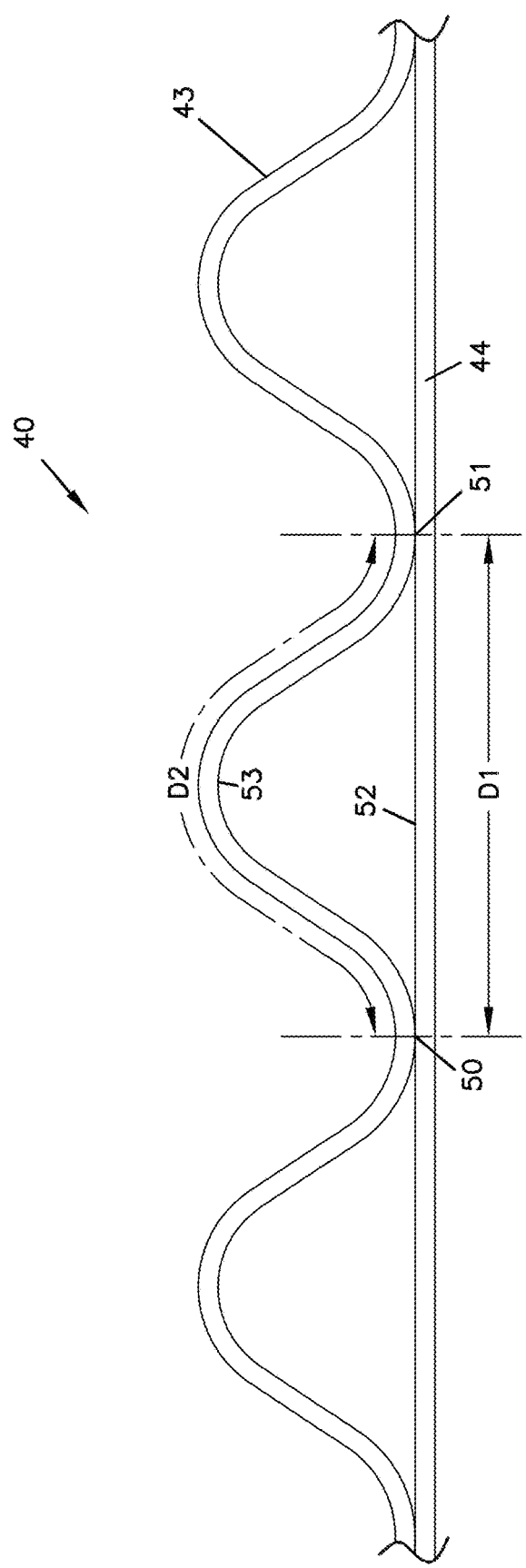
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

B. Manufacture of Media Pack Configurations Including the Media of FIGS. 1-3, See FIGS. 4-7

Figure 4:
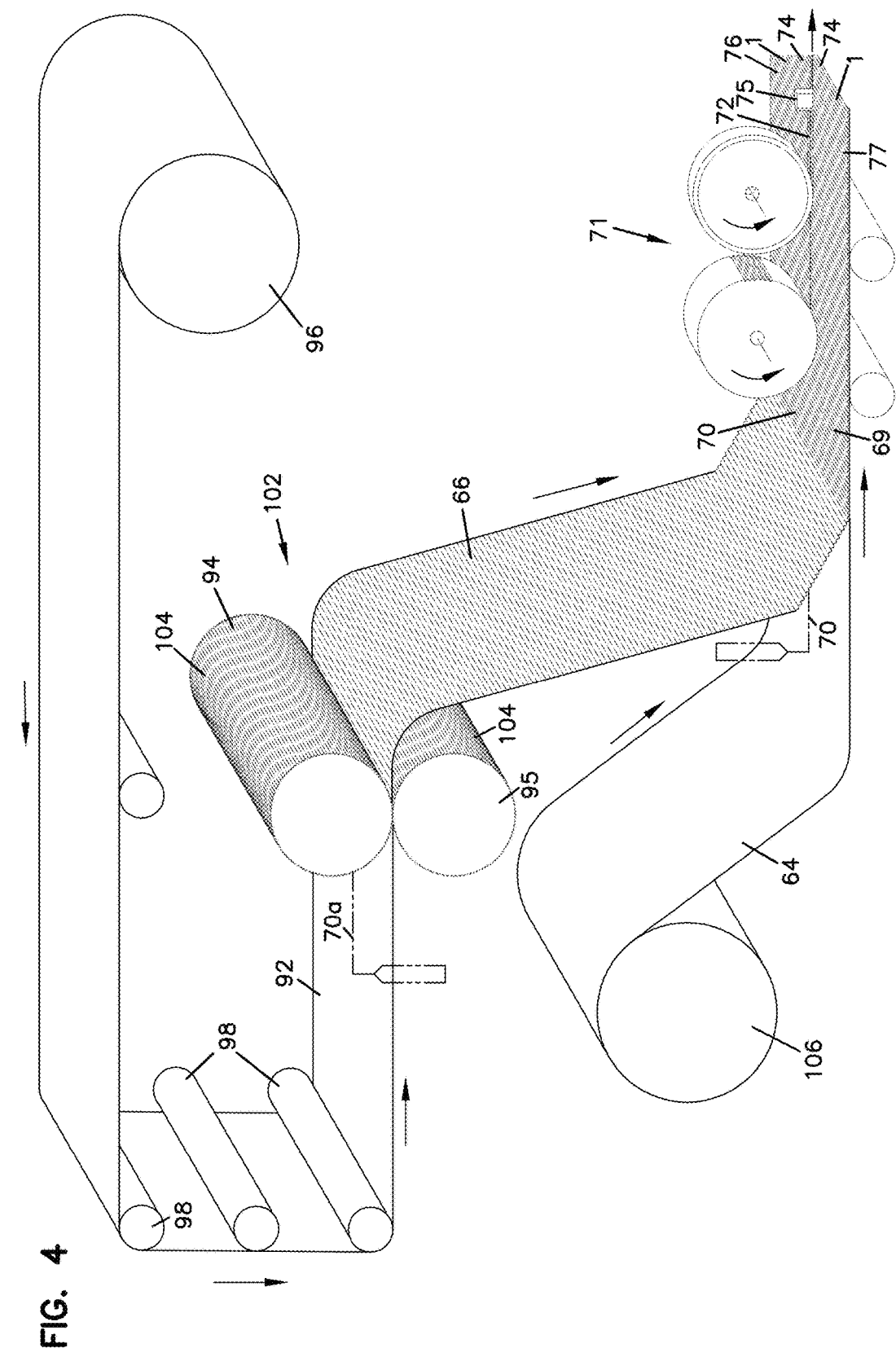
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
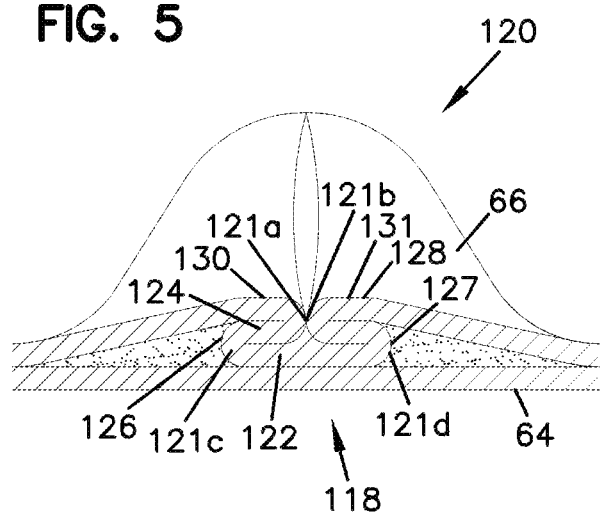
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
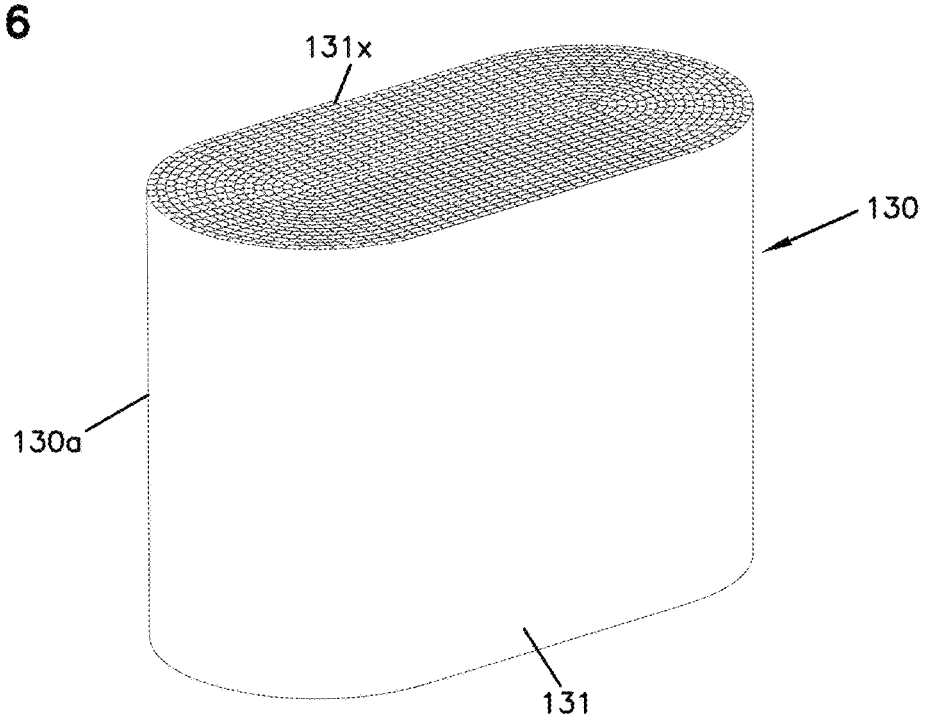
FIG. 6 is a schematic perspective view of a coiled filter arrangement usable in a filter cartridge according to the present disclosure, and made with media in accord with FIG. 1.

In FIG. 6, a coiled media pack (or coiled media) 130 constructed by coiling a single strip of single faced media is depicted, generally. The particular coiled media pack depicted is an oval media pack 130a, specifically a racetrack shaped media pack 131. The tail end of the media, at the outside of the media pack 130 is shown at 131x. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
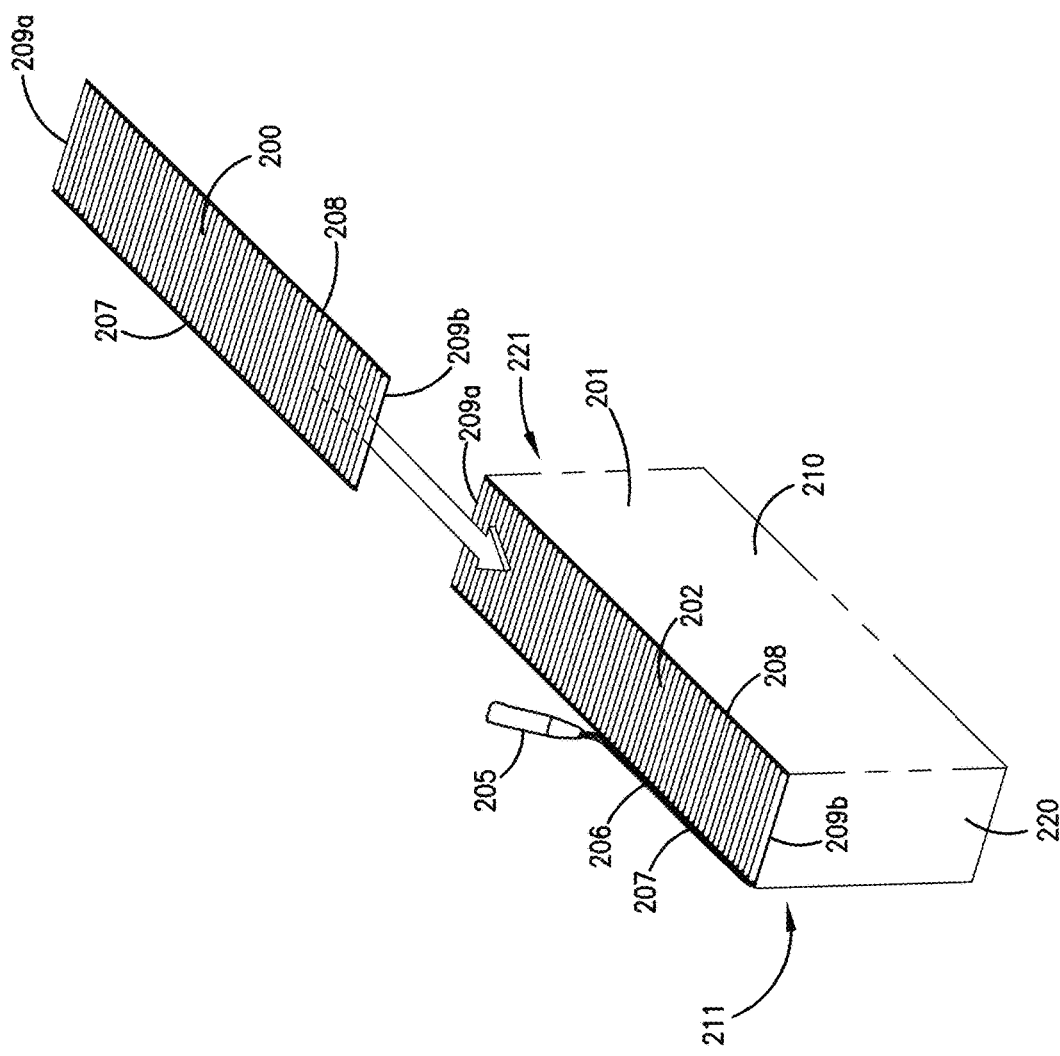
FIG. 7 is a schematic perspective view of a stacked media pack arrangement usable in an arrangement according to the present disclosure and made with media in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
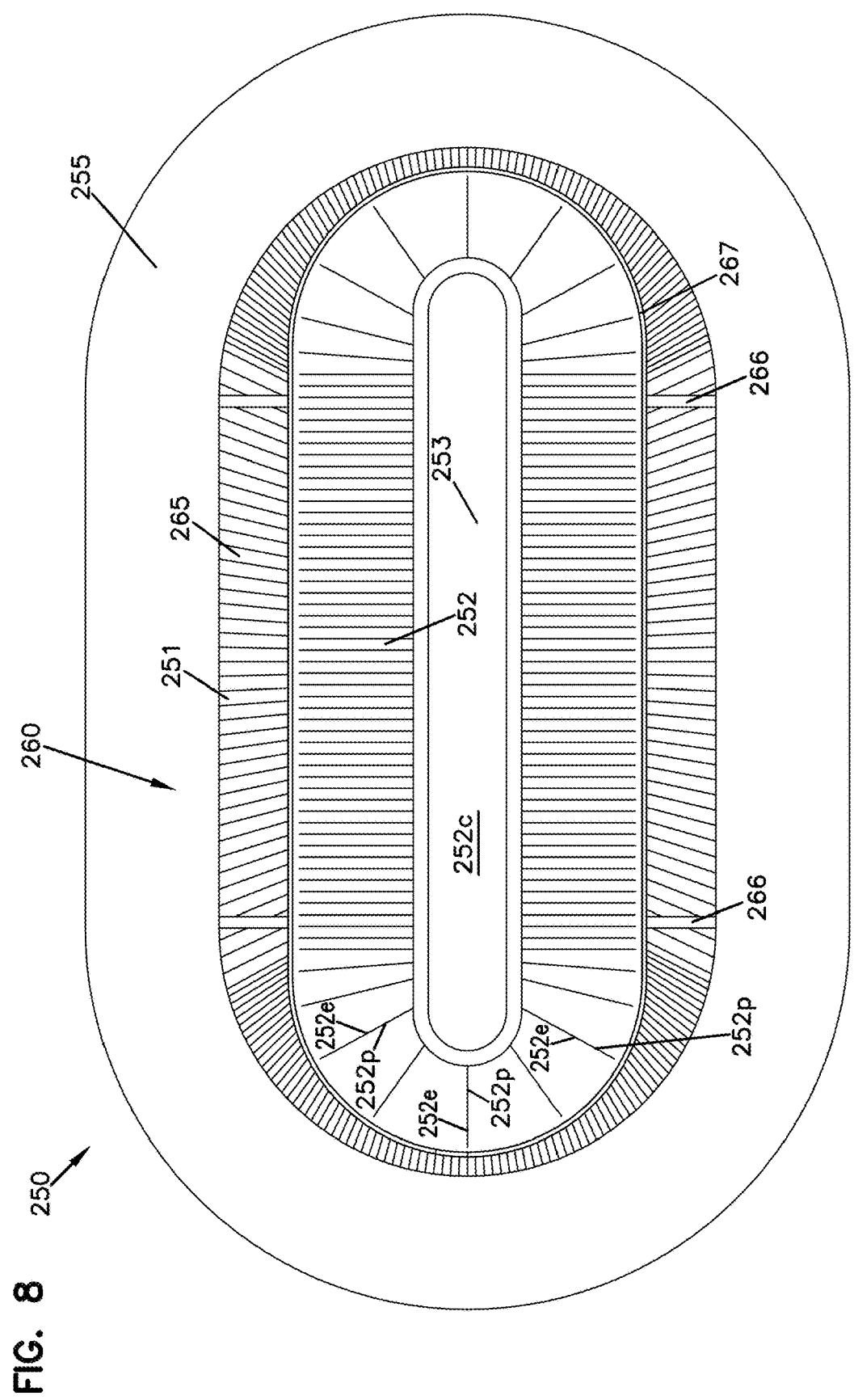
FIG. 8 is a schematic flow end view of a filter media pack using an alternate media to the media of FIG. 1, and alternately usable in filter cartridges in accord with the present disclosure.

C. Selected Media or Media Pack Arrangements Comprising Multiple Spaced Coils of Fluted Media; FIGS. 8-8B Alternate types of media arrangements or packs that involve flow between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
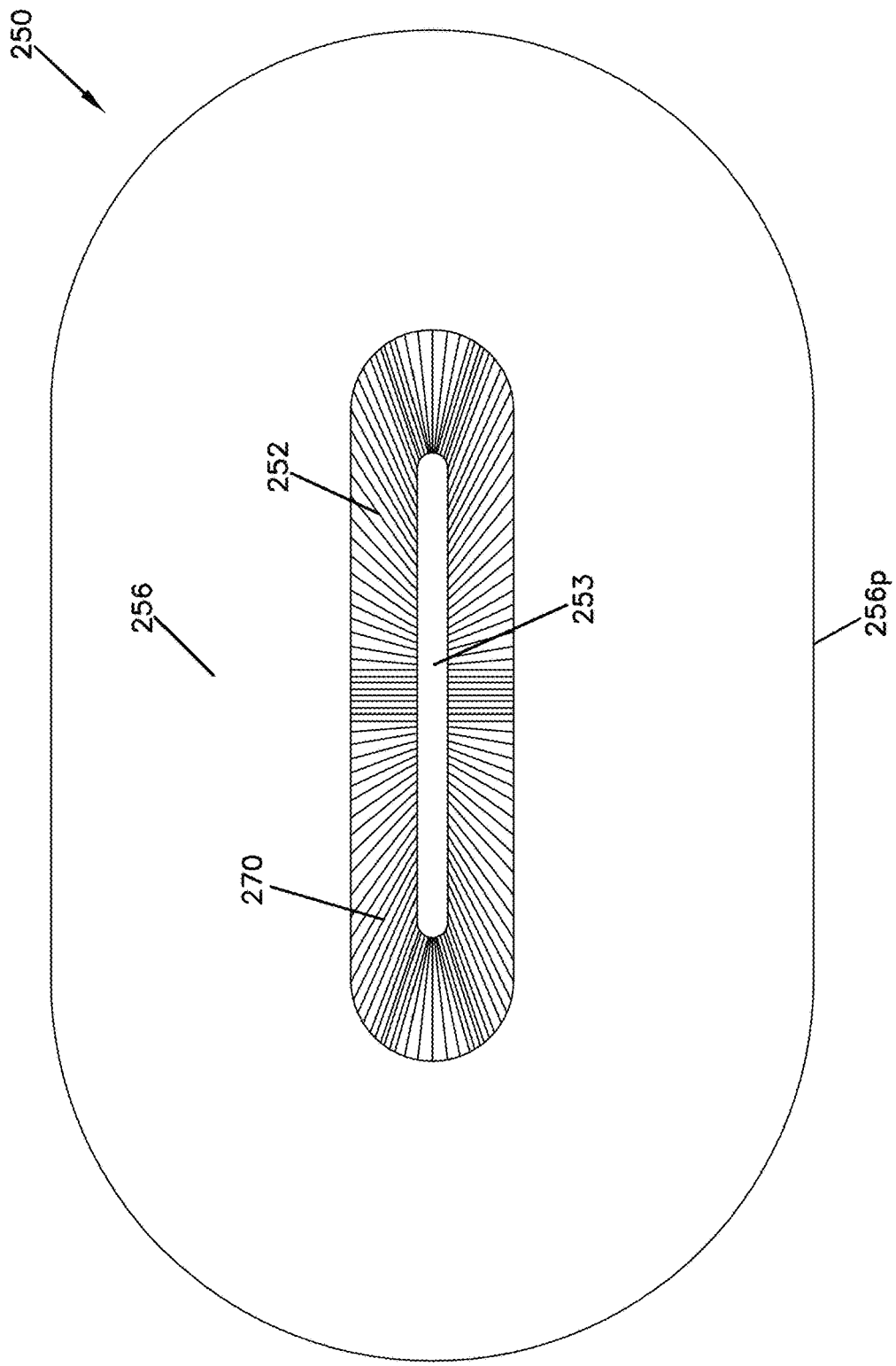
FIG. 8A is a schematic opposite flow end view to the view of FIG. 8.
Figure 8B:
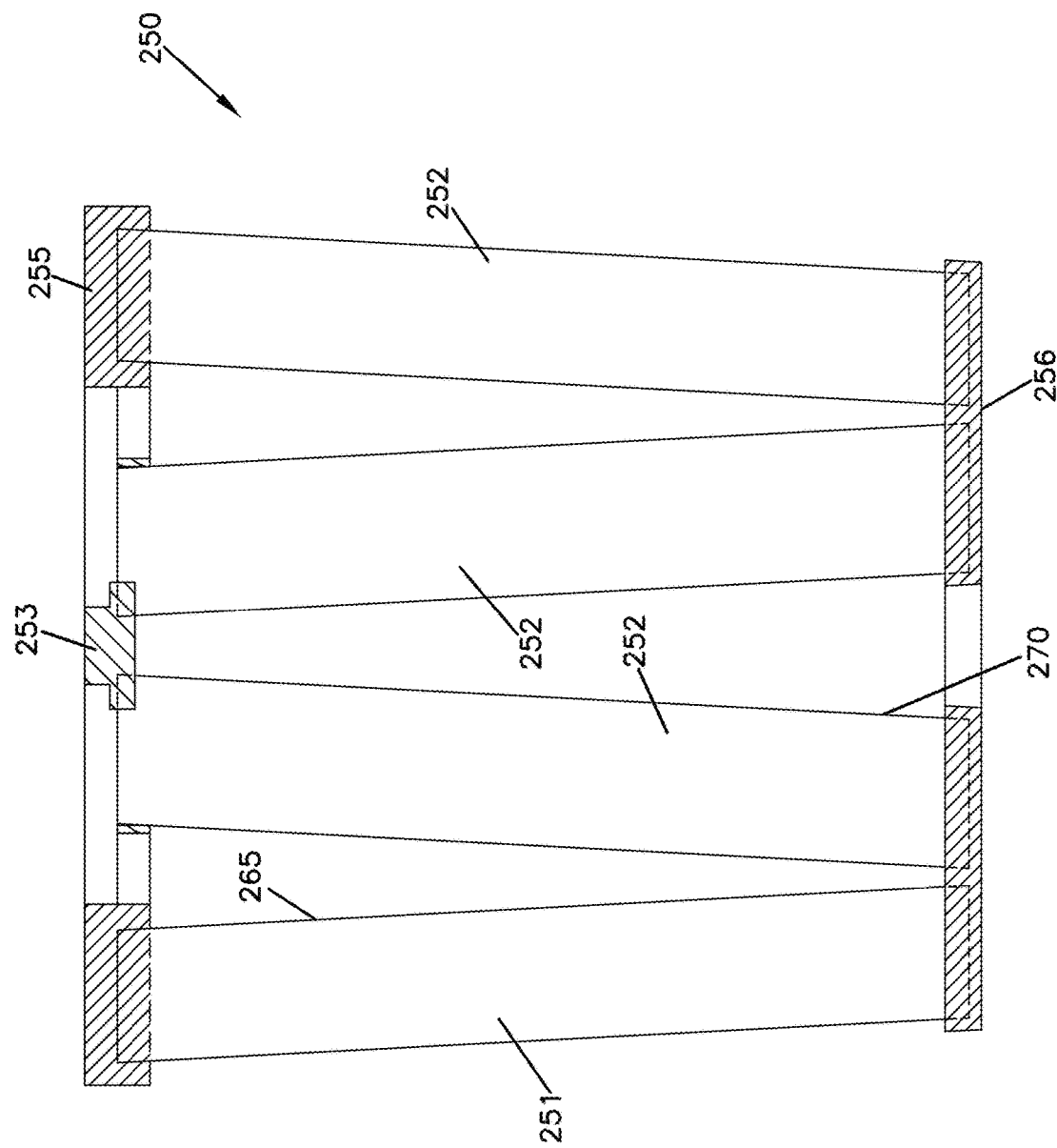
FIG. 8B is a schematic cross-sectional view of the media pack of FIGS. 8 and 8A.
Figure 9:
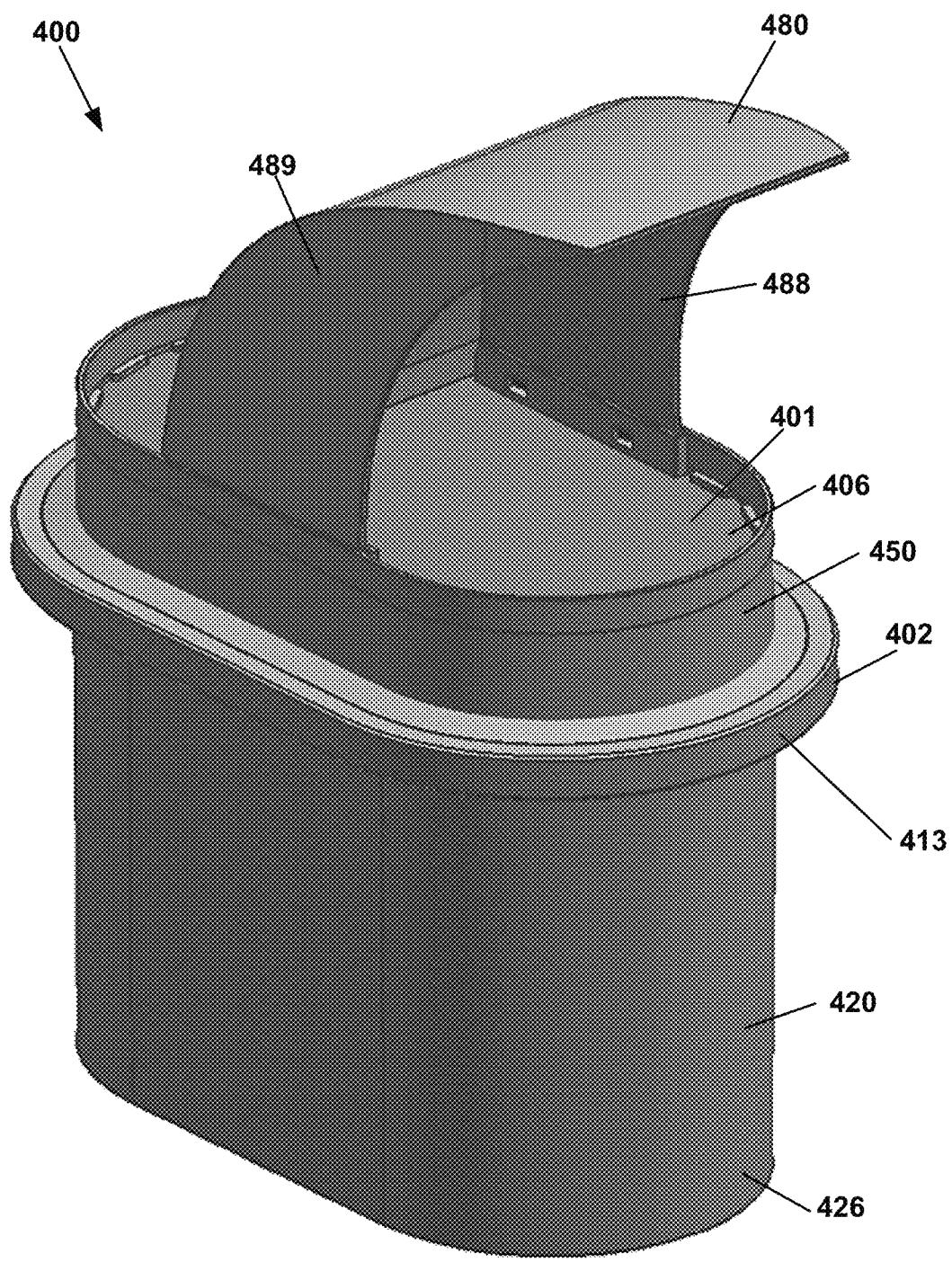
FIG. 9 is a perspective view of an exemplary filter cartridge incorporating features according to the present disclosure.
Figure 10:
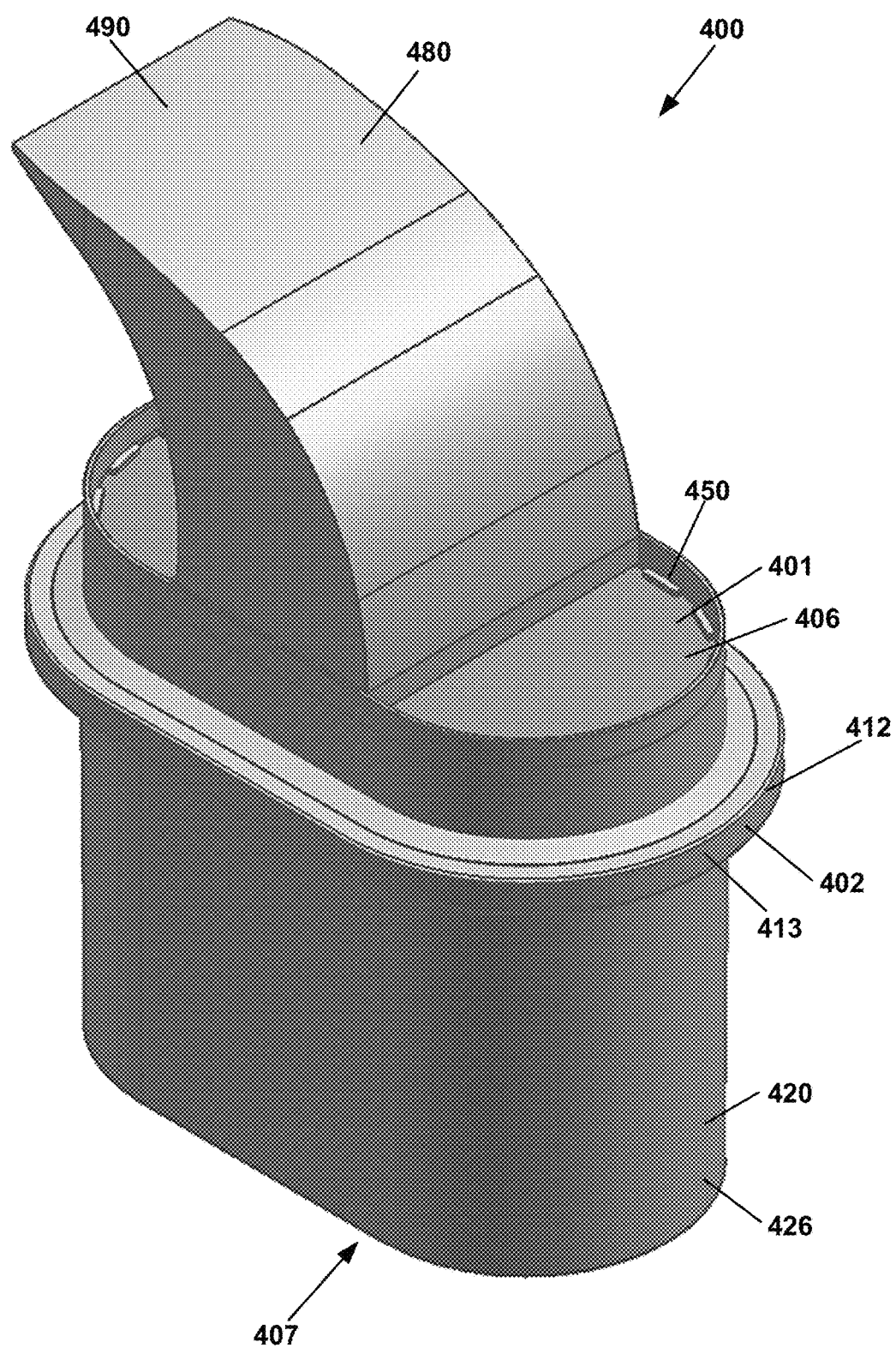
FIG. 10 is an alternate perspective view of the filter cartridge of FIG. 9.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

B. Additional Media Types

Many of the techniques characterized herein will preferably be applied when the media orients for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, and are configured for large loading volume during use. These types of systems will typically be ones in which the media is configured with pleat tips or flutes extending in a direction between opposite flow ends.

II. Selected Identified Issues with Various Air Cleaners

A. General

Air cleaner assemblies that use relatively deep filter media packs, for example, in general accord with one or more of FIGS. 6-8B, have proliferated. As to example actual products in the marketplace, attention is directed to the air cleaners of Donaldson Company, Inc. the Assignee of the present disclosure sold under the trade designation "Powercore;" and, also, to the products of Mann & Hummel provided under the designation "IQORON."

In addition, air cleaner assemblies using such media packs can be incorporated in a wide variety of original equipment (on road trucks, buses; off road construction equipment, agriculture and mining equipment, etc.) on a global basis. Service parts and servicing are provided by a wide range of suppliers and service companies.

B. Identification of Appropriate Filter Cartridges

It is very important that the filter cartridge selected for servicing be an appropriate one for the air cleaner of concern. The air cleaner is a critical component in the overall equipment. If servicing is required to occur more frequently than intended, the result can be added expense, downtime for the equipment involved and lost productivity. If the servicing is not done with a proper part, there may be risk of equipment failure or other problems.

The proper cartridge for the air cleaner of concern and equipment of concern, is generally a product of: product engineering/testing by the air cleaner manufacturer; and, specification/direction/testing and qualification by the equipment manufacturer and/or engine manufacturer. Servicing in the field may involve personnel selecting a part that appears to be similar to the one previously installed, but which is not the proper, qualified, component for the system involved.

It is desirable to provide the air cleaner assembly, regardless of media type, with features that will help readily identify to the service provider that an effort to service the assembly is being made with a proper (or improper) filter cartridge. Features and techniques described herein can be provided to obtain this benefit as described below.

In addition, assembly features and techniques which are advantageous with respect to manufacture and/or filter component integrity are described. These can be implemented with features and techniques of the type relating to helping ensure that the proper cartridge is installed in an assembly, or in alternate applications.

C. Mass Air Flow Sensor Issues

In many systems, a mass air flow sensor is provided downstream from the filter cartridge and upstream from the engine, to monitor air flow characteristics and contaminant characteristics. In some instances, minor modifications in media pack configuration and orientation, can lead to fluctuations in mass air flow sensor operation. It is therefore sometimes desirable to provide the air cleaner assembly with features in the filter cartridge and air cleaner, such that variation in air flow from the filter cartridge is managed to a relative minimum. This can facilitate mass air flow sensor use and operation. The features and techniques described herein can be provided to obtain this benefit.

D. Stable Filter Cartridge Installation

In many instances, the equipment on which the air cleaner is positioned is subject to substantial vibration and shock during operation. The types of media packs described above in connection with FIGS. 6-8B, are often constructed relatively deep, i.e. with long flutes and having depth of extension in the air flow direction of at least 50 mm and often at least 80 mm more, in many instances more than 100 mm. Such deep filter cartridges can load with substantial amounts of contaminant during use, and gain substantially in weight. Thus, they can be subject to significant vibration momenta during operation. It is desirable to provide features in the filter cartridge that help ensure stable positioning of the cartridge, avoidance of damage to the media (or media pack) in the event of movement, and avoidance of seal failure during such vibration and shock.

Similarly, the equipment may be subject to a wide variety of temperature ranges during storage and use. These can lead to expansion/contraction of materials relative to one another. It is desirable to ensure that the filter cartridge and air cleaner are constructed in such a manner that seal integrity is not compromised under these circumstances. The features and techniques described herein can be applied to address these concerns, as discussed below.

E. Summary

The features characterized herein can be used to advantage to address one or more of the concerns described above. There is no specific requirement that the features be implemented in a manner that maximally addresses all concerns. However, selected embodiments are described in which all of the concerns identified above are addressed to a significant and desirable extent.

III. Example Air Cleaner and Filter Cartridge Arrangements

Principles according to the present disclosure can be applied in a wide variety of specific arrangements to accomplish advantage in accord with the present disclosure. This can be understood from a review of the embodiment and features of a filter cartridge and air cleaner, depicted in FIGS. 9-23.

Now referring first to FIGS. 9-12, at 400 an air filter cartridge having general features in accord with the present disclosure is depicted. The cartridge 400, generally, has opposite flow ends and comprises: media (i.e. a media pack) 401 oriented to filter fluid between those opposite ends; and, a seal arrangement 402.

As will be apparent from the further descriptions below, although alternatives are possible, the media pack 401 may be generally in accord with media packs described above in connection with FIGS. 6-8B. In the specific example 400 depicted, the media pack 401 has an oval perimeter shape. Thus, it can be used with a media pack in accord with FIG. 6 or FIGS. 8-8B. However, the principles can even be applied in connection with media pack in accord with FIG. 7, provided the outer perimeter is configured substantially oval, for example by cutting.

Alternatively, as discussed below, the seal features of the arrangement of FIGS. 9-12 can be applied with alternately shaped media or media packs, including, for example, circular or rectangular ones. Thus, while the media or media pack 401 has a generally oval outer perimeter, there is no specific requirement that the perimeter definition be oval in order to obtain some advantage in accord with the present disclosure.

The particular seal arrangement 402 depicted is of a type generally characterized herein as a perimeter pinch seal arrangement. The term "pinch seal arrangement" in this context is meant to refer to a seal member that is pinched between air cleaner (housing) features, when the cartridge is assembled.

The term "perimeter" in connection with seal arrangement 402, is meant to refer to a seal arrangement that generally defines an outer most perimeter of the cartridge 400. In this example, the perimeter seal arrangement 402 is positioned to surround the media pack 401.

For the example media pack 401 depicted, the perimeter shape definition of the media pack 401 is of an oval shape, sometimes referred to herein as "racetrack," since it has two opposite straight sides 401a, 401b and two opposite curved ends 401c, 401d. Alternate oval shapes, for example elliptical, and indeed non-oval shapes can be practiced with arrangements according to the present disclosure.

The particular media pack 401 depicted has a length to width ratio of greater than 1. Although alternatives are possible, length to width ratios within the range of at least 1.3:1, for example, about 1.3:1 to 5:1, inclusive, for example, 1.1:1 to 3.5:1, inclusive, are typical for many applications of the principles described herein. The principles can be applied in alternate media packs, however. Indeed, they can be applied with circular or square media packs in some instances.

The particular media pack 401 depicted has a first flow end 406 (corresponding to a cartridge first flow end) and a second, opposite, flow end 407 (corresponding to the second, opposite, second cartridge flow end). The (fluid) air during filtering is generally passed from one flow end toward or past the other. In a typical application, end 406 will be the inlet flow end and end 407 will be outlet flow end, but the alternative is possible. The media pack 401, then, is generally configured such that air (fluid) cannot flow through the media from one flow end (for example end 406) through (or past) the opposite end (for example end 407) without passing through the media and being filtered.

Although alternatives are possible, typically, the media pack 401 will have a dimension between the flow ends 406, 407 of at least 50 mm, typically at least 80 mm, often at least 100 mm, and in many instances 150 mm or more (indeed sometimes 200 mm or more). This is a relatively deep or long media pack. It will often be configured with flutes (or pleat tips) extending in a direction between the flow ends 406, 407. Of course, this will be the case when the media is in a media pack of the types characterized above in connection with FIGS. 6-8B.

The seal arrangement 402 generally comprises a seal member 412 having an (outer) peripheral perimeter edge surface 413. The (outer) peripheral perimeter edge surface 413 is often not a sealing surface, in many applications according to the present disclosure. While it may engage a surrounding housing feature, for example, with a surface-surface contact, it is typically not required that it be configured to form and maintain a seal with such a housing surface, in use. In some applications, a seal can be provided at this location, but it is typically not preferred. This will be apparent from later discussions herein.

The seal member 412 depicted is a resilient member that has first and second, opposite, pinch surfaces 414, 415, at least one of which, in the example at least surface 415, is an axial sealing surface. These surfaces are generally engaged by (between) housing components or sections in a compressive or pinch manner, providing for pinch seal when the cartridge 400 is installed. Typically, a selected one of the surfaces 414, 415 (which in the example is the one 415 toward the downstream side or end) but alternatives are possible, will be configured as a surface that forms a more critical housing engagement (for sealing). Although alternatives are possible, for a typical arrangement, the seal member 412 will be positioned more toward an upstream flow end than a downstream flow end. When this is the case, surface 414 will typically be a compression surface but not, specifically, the more critical sealing surface; and, surface 415 will be the more critical (axial) sealing surface, since it will engage the housing at a location downstream of a joint between housing pieces.

The (outer) peripheral perimeter edge surface 413 can be provided with a variety of shapes. In the example depicted, it is generally oval, but includes selected variations or contouring therein, discussed below. It can generally mimic the shape of the media or media pack, as shown, but can also be varied substantially therefrom if desired.

Again referring to FIGS. 9-12, a shell arrangement 420 surrounds the media pack 401. The shell arrangement 420 is shown in isolation in FIGS. 15-17. The shell arrangement 420 includes a shell body 422 that can be provided having a shape that generally corresponds to the shape of the media pack 401. The shell body has a shell body first end 424 and a shell body second end 426. The shell body first end 424 includes a first seal support 430 extending in a direction away from the media pack 401. The first seal support 430 is provided for supporting the seal member 412. The shell body second end 426 includes a filter media support 432 that retains the media pack 401 within the shell arrangement 420.

The first seal support 430 is generally provided as a radially extending flange 434 having a plurality of opening 436 therein. The first seal support 430 can be provided with a lead in portion 438 to help facilitate introduction of the media pack 401 into the shell arrangement 420. The lead in portion 438 can act as a funnel to assist with the insertion of the media pack 401 therein. The seal support 430 can additionally include a seal support portion 440. The seal support portion 440 is preferably provided extending in a radial direction when the seal member 412 is arranged as an axial pinch seal. Preferably, the first seal support 430 is located between the media pack first end 406 and the media pack second end 407 when the media pack 401 is provided within the shell arrangement 420. The first seal support 430 can include a plurality of openings 436. The openings 436 can be provided extending into both the lead in portion 438 and the seal support portion 440.

The filter media support 432 can be provided extending from a shell body first side 442 to a shell body second side 444. When the filter pack 401 is introduced into the shell arrangement 420, the filter media support 432 helps contain the media pack 401 in place.

A ring arrangement 450 is provided for surrounding the media pack 401 and engaging the shell arrangement 420. The ring arrangement 450 is illustrated in an isolation in FIGS. 18-20. The ring arrangement 450 includes a ring body 452 that can be provided having a shape generally corresponding to the shape of the media pack 401 and surrounding the media pack 401. The ring body 442 includes a ring body first end 454 and a ring body second end 456. The ring body first end 454 can be provided with a plurality of stops or projections 458 extending from an inside surface 459 of the ring body 452 and provided for holding the media pack 401 in place. The ring body second end 456 includes a second seal support 460 that supports the seal member 412. The second seal support 460 includes a plurality of projection 462 that are constructed so that they extend away from the media pack 401 and toward the plurality of openings 436 when the ring arrangement 450 and the shell arrangement 420 are located around the media pack 401. The plurality of projections 462 are structured so that they engage the plurality of openings 436 extending from the lead in portion 438 to the seal support portion 440. The plurality of projections 462 can be provided having a generally triangular shape, and can be provided extending generally downwardly to engage the plurality of openings 436.

Figure 21:
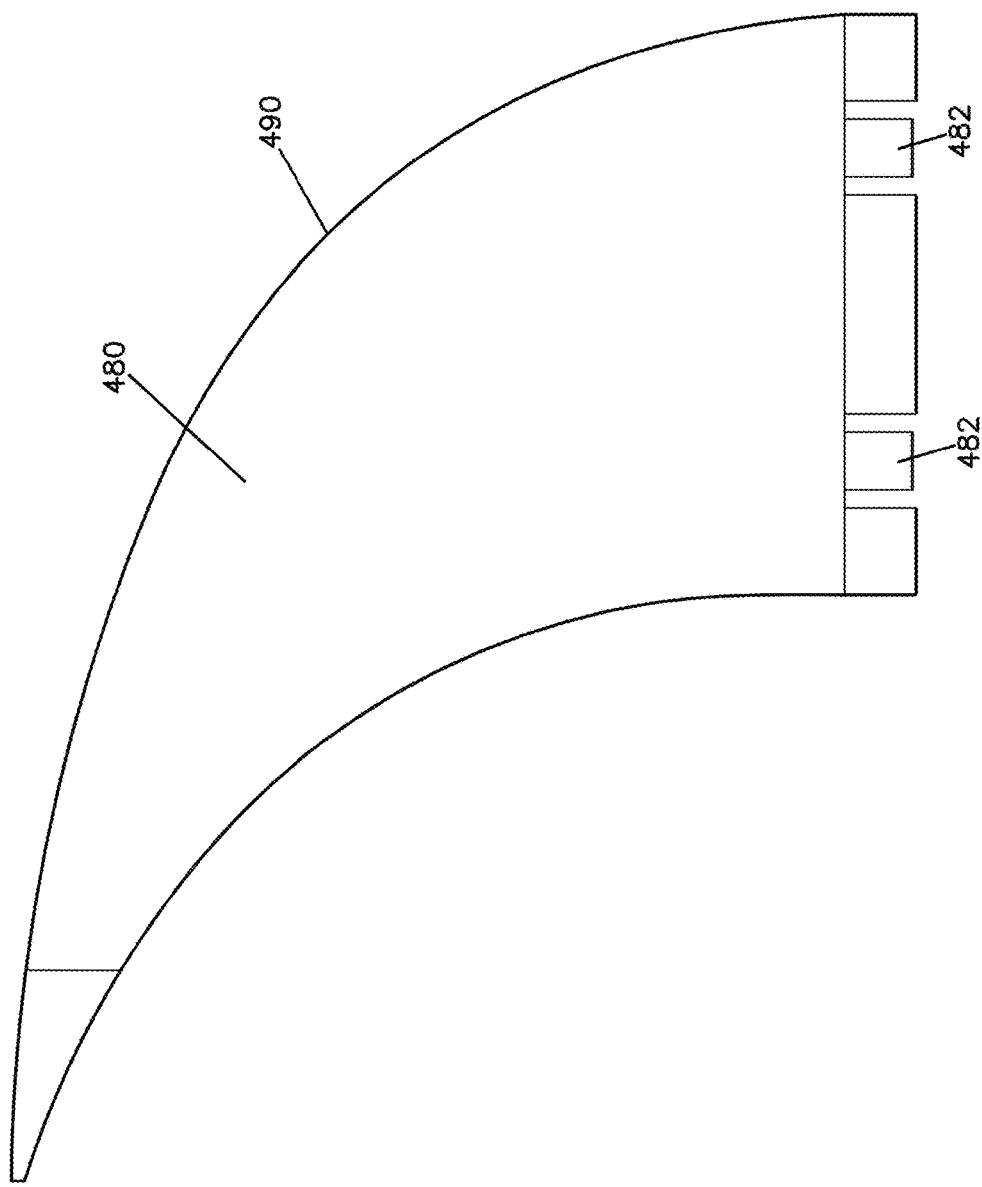
FIG. 21 is a side view of the fin arrangement of FIGS. 9 and 10.
Figure 22:
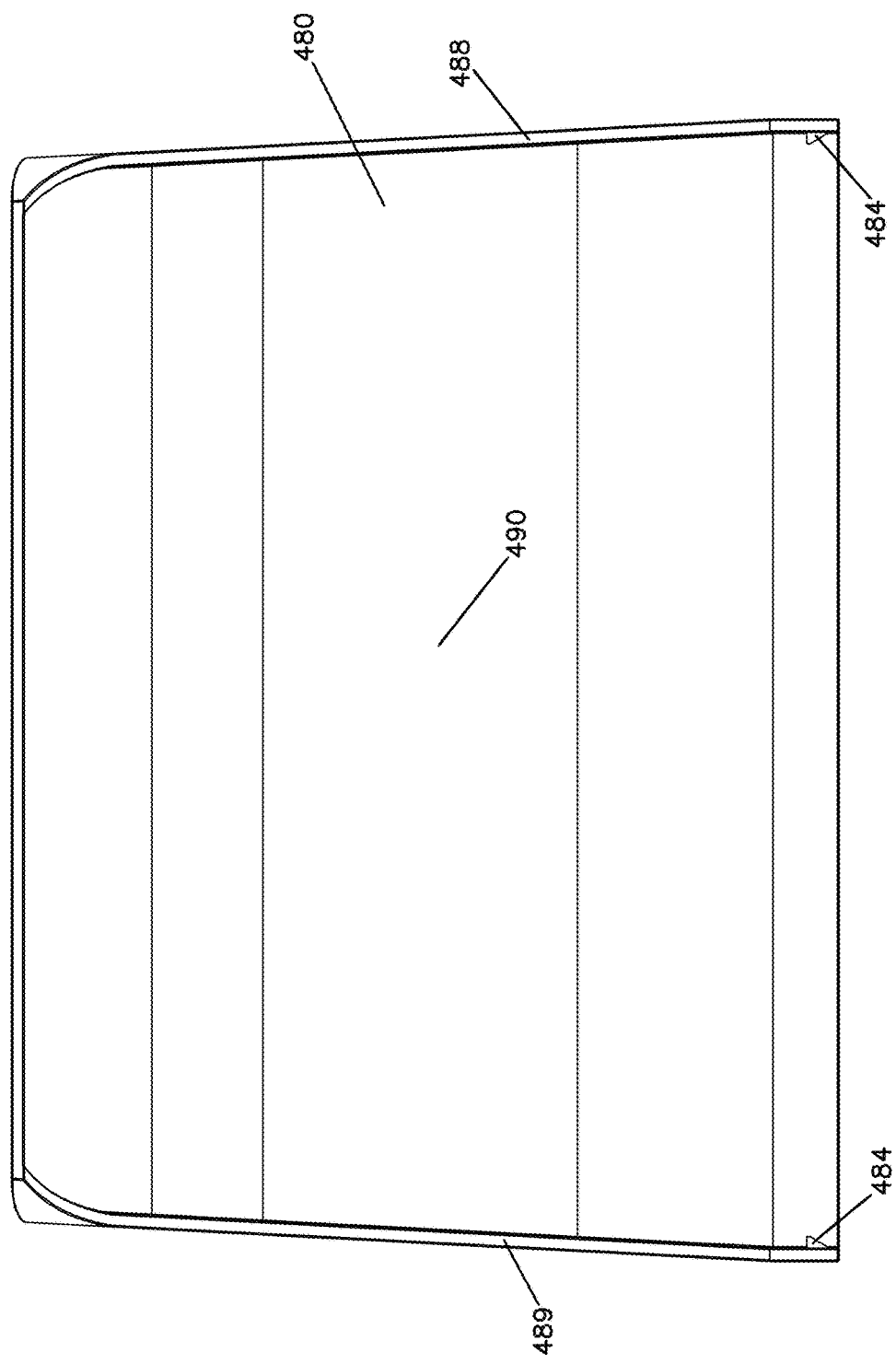
FIG. 22 is a front view of the fin arrangement of FIG. 21.
Figure 23:
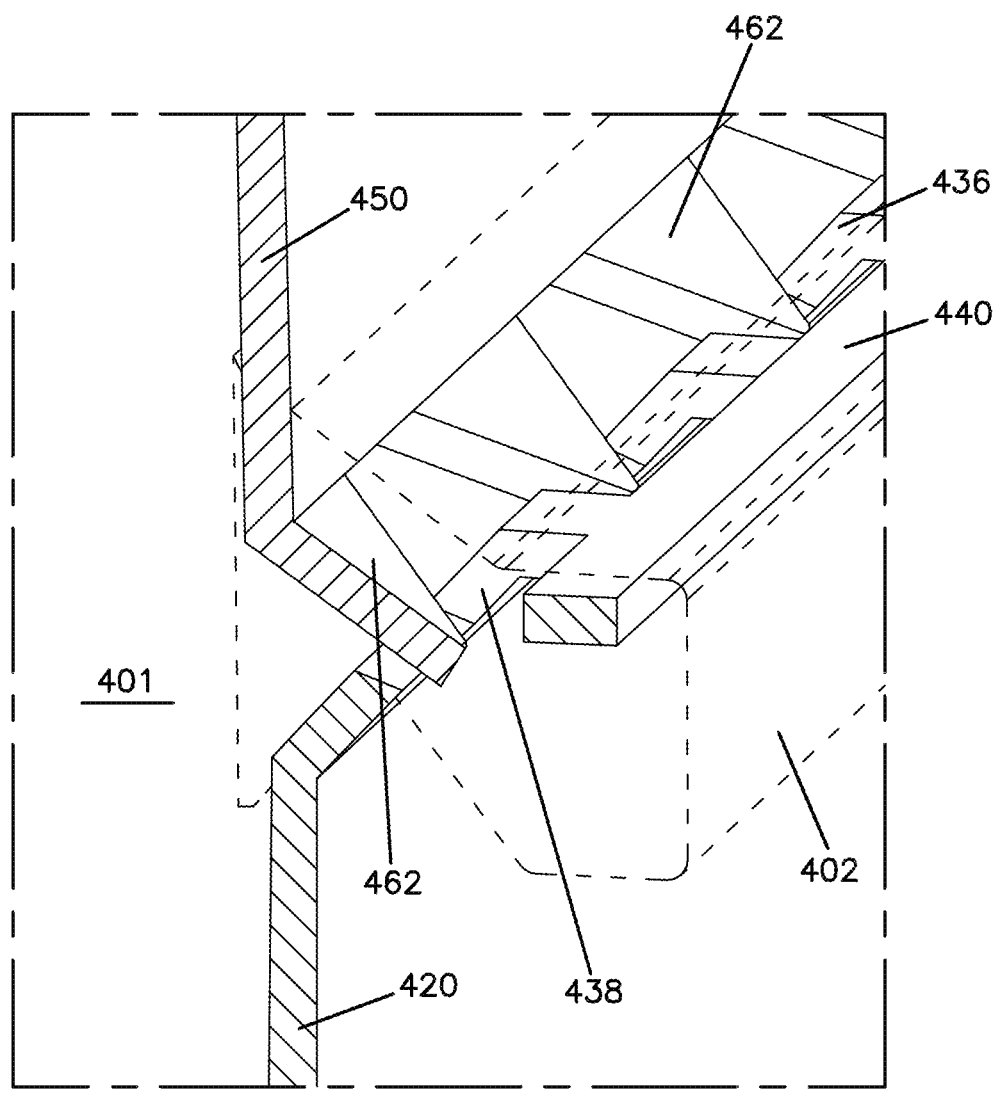
FIG. 23 is a perspective view illustrating the engagement of the shell arrangement and the ring arrangement with the seal member shown in outline.

Provided as an optional component is an air deflector or vane member 480 extending from the ring body 452. FIGS. 21 and 22 show the vane member 480 in isolation. The vane member 480 can be provided having tabs 482 that can deflect and that have hooks 484 that engage slots 486 on the ring body sides 451a and 451b. The vane member 480 includes sides 488 and 489, and a curved member 490 for directing air to or away from the media pack 401. An advantage of providing tabs 482 that snap into the slots 486 is that the filter cartridge 400 can be assembled and the vane or air deflector 480 can be added near the end of assembly. Because of the bulkiness of the air deflector or vane 480, it is desirable to add the air deflector of vane 480 after the seal member 412 is molded thereby locking the media pack 401 between the shell arrangement 420 and the ring arrangement 450.

Figure 13:
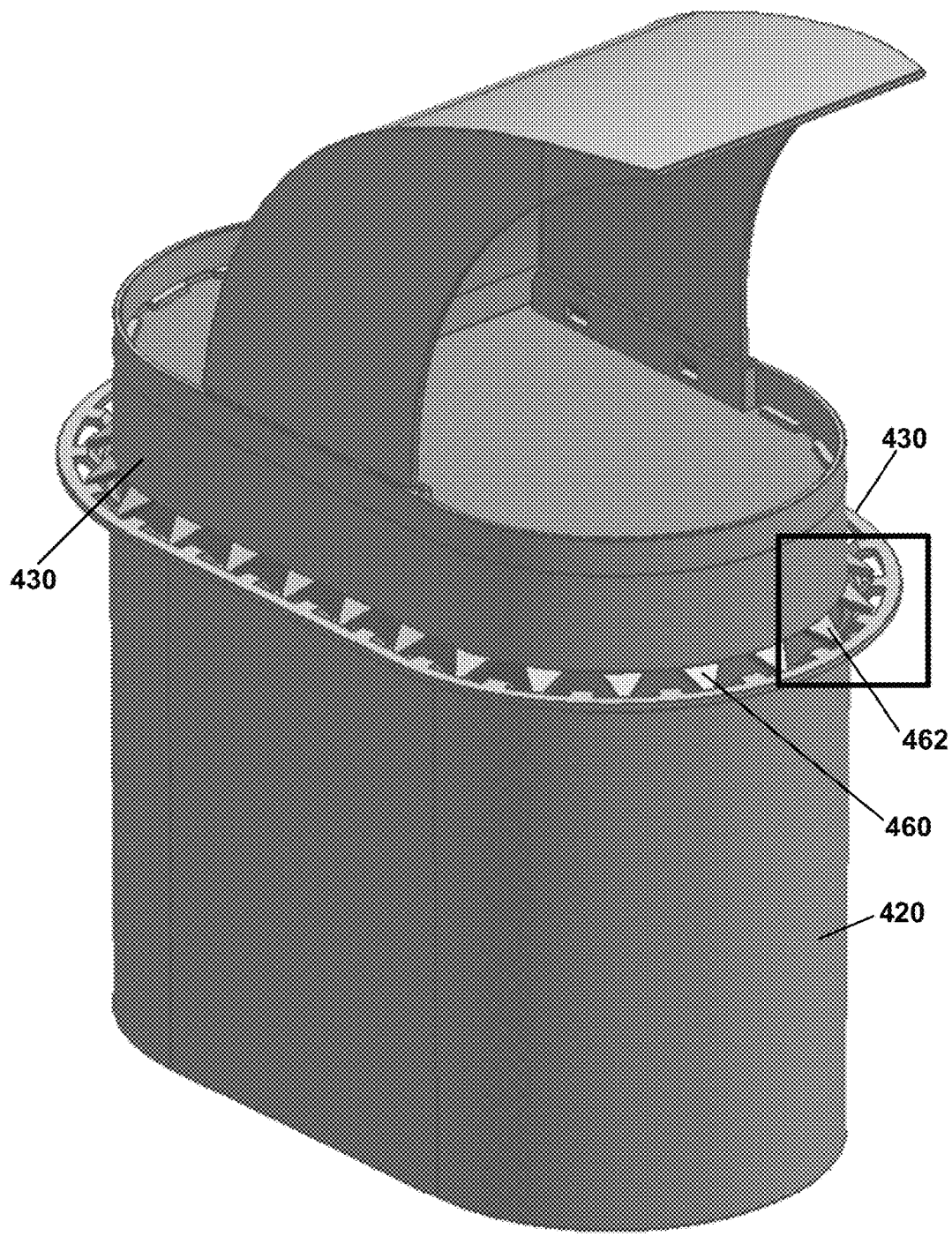
FIG. 13 is a perspective view of the filter cartridge of FIGS. 9 and 10 assembled but without the axial seal member.
Figure 14:
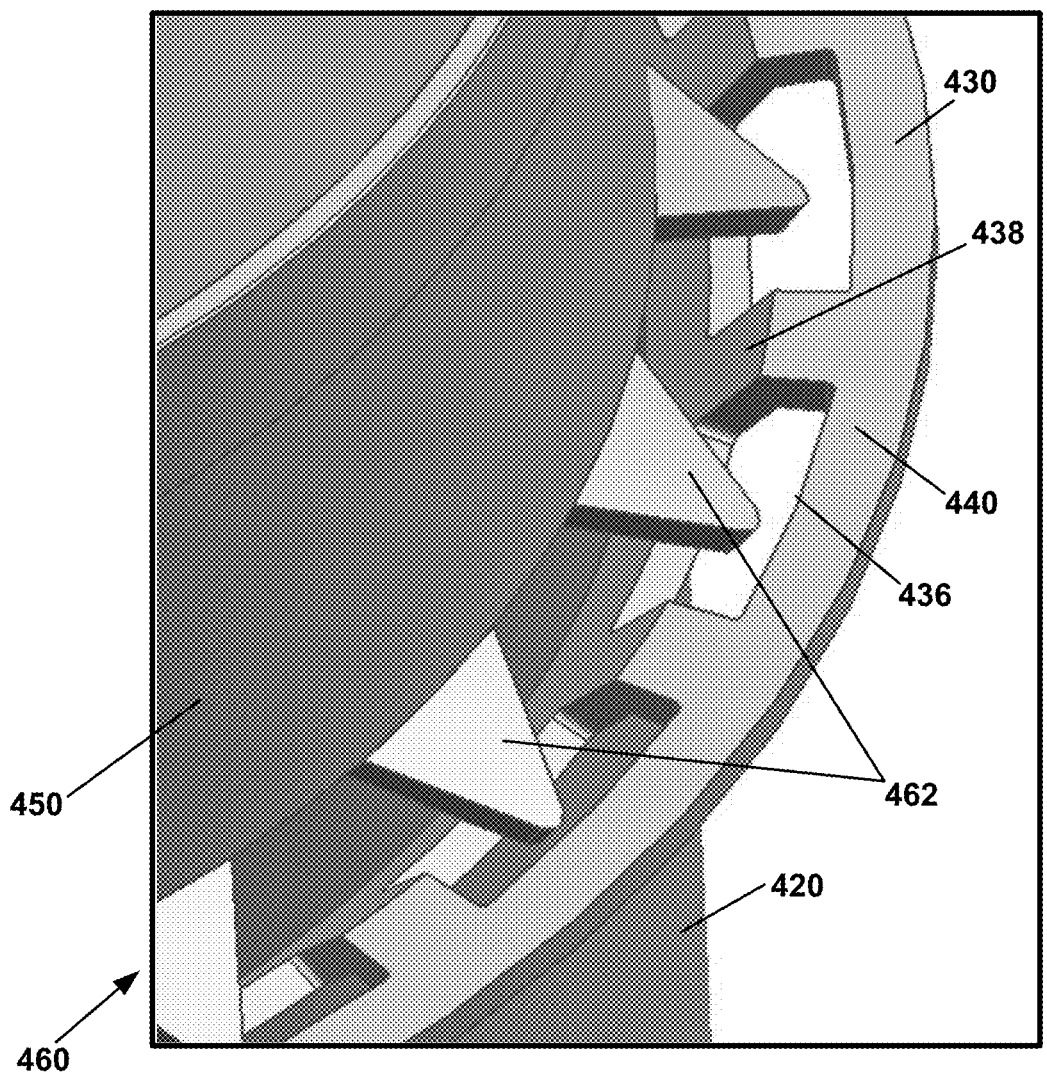
FIG. 14 is an enlarged view of a portion of FIG. 13.
Figure 15:
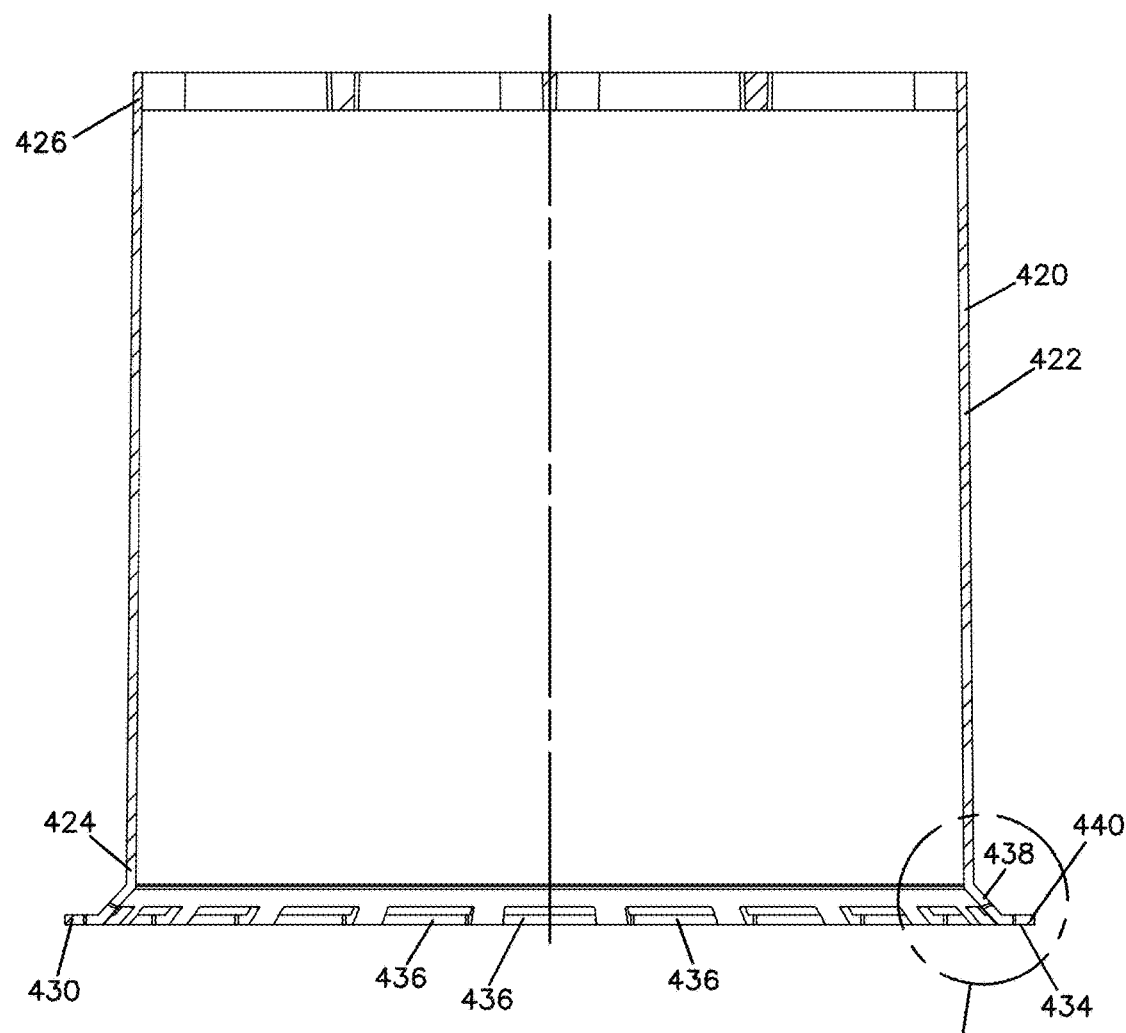
FIG. 15 is a sectional view of the shell arrangement of FIGS. 9 and 10.
Figure 16:
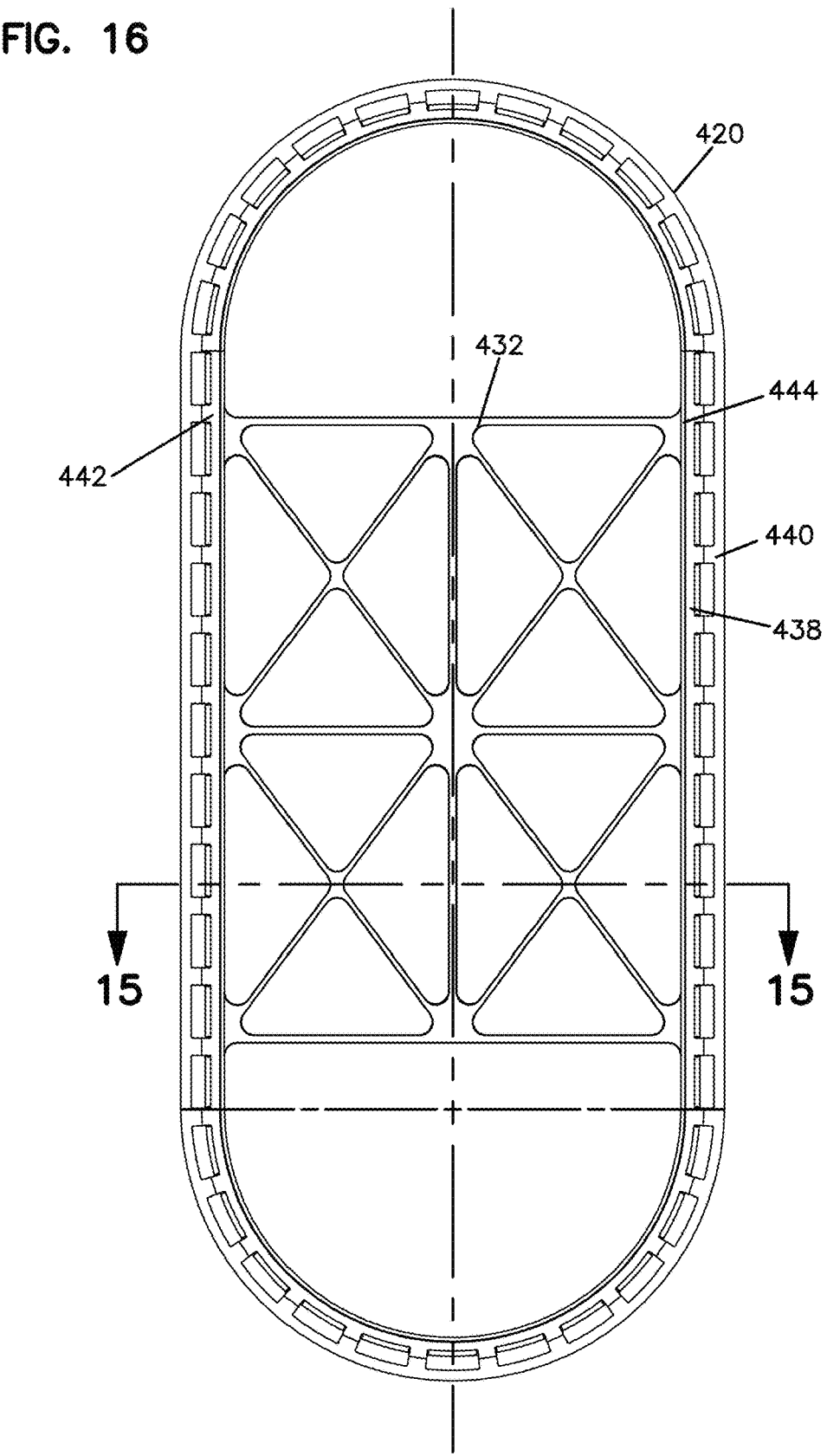
FIG. 16 is a top view of the shell arrangement of FIGS. 9 and 10.
Figure 17:
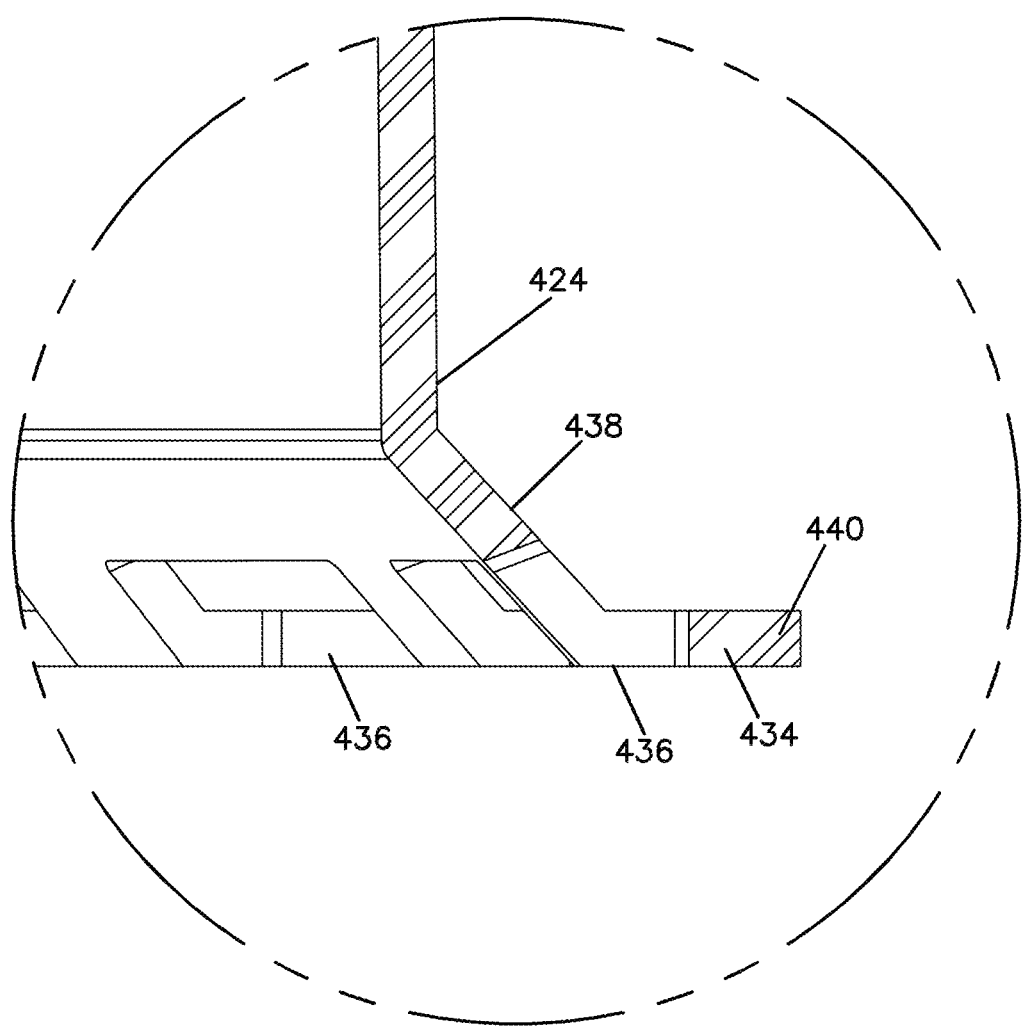
FIG. 17 is an enlarged view of a portion of the shell arrangement of FIG. 15.
Figure 18:
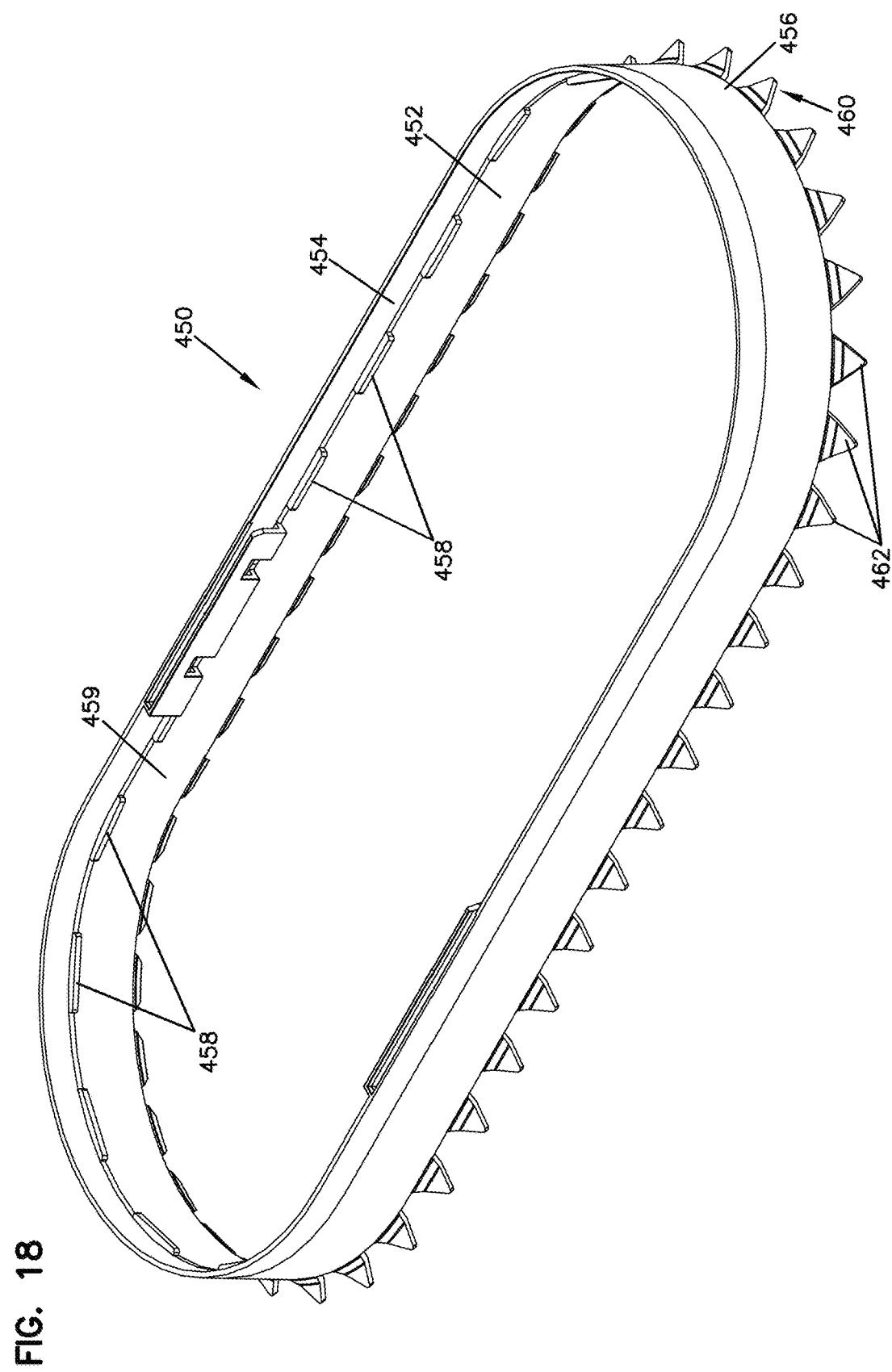
FIG. 18 is a perspective view of the ring arrangement of FIGS. 9 and 10.

Now referring to FIGS. 13 and 14, the first seal support 430 and the second seal support 450 are shown arranged together but without the seal member 402 provided locking them together. The first seal support 430 includes a lead in or funnel portion 438 and a seal support portion 440. A plurality of slots or openings 436 are provided in the funnel portion 438 and the seal support portion 440. The second seal support 460 includes a plurality of projections 462 wherein the plurality of projections 462 are sized to fit within the plurality of openings 436. Once the shell arrangement 420 and the ring arrangement 450 are arranged around the media pack 401 so that the plurality of projections 462 engage the plurality of openings 436, a seal material can be molded over the combination of the plurality of projections 462 and the plurality of openings 436 to hold the shell arrangement 420 and the ring arrangement 450 together with the media pack 401 therebetween. Now referring to FIG. 23, the seal member 402 is illustrated in dotted lines. In addition to holding the shell arrangement 420 and the ring arrangement 450 together, the seal member 402 can be provided for adhering the shell arrangement 420 and the ring arrangement 450 to the media pack 401.

Figure 24:
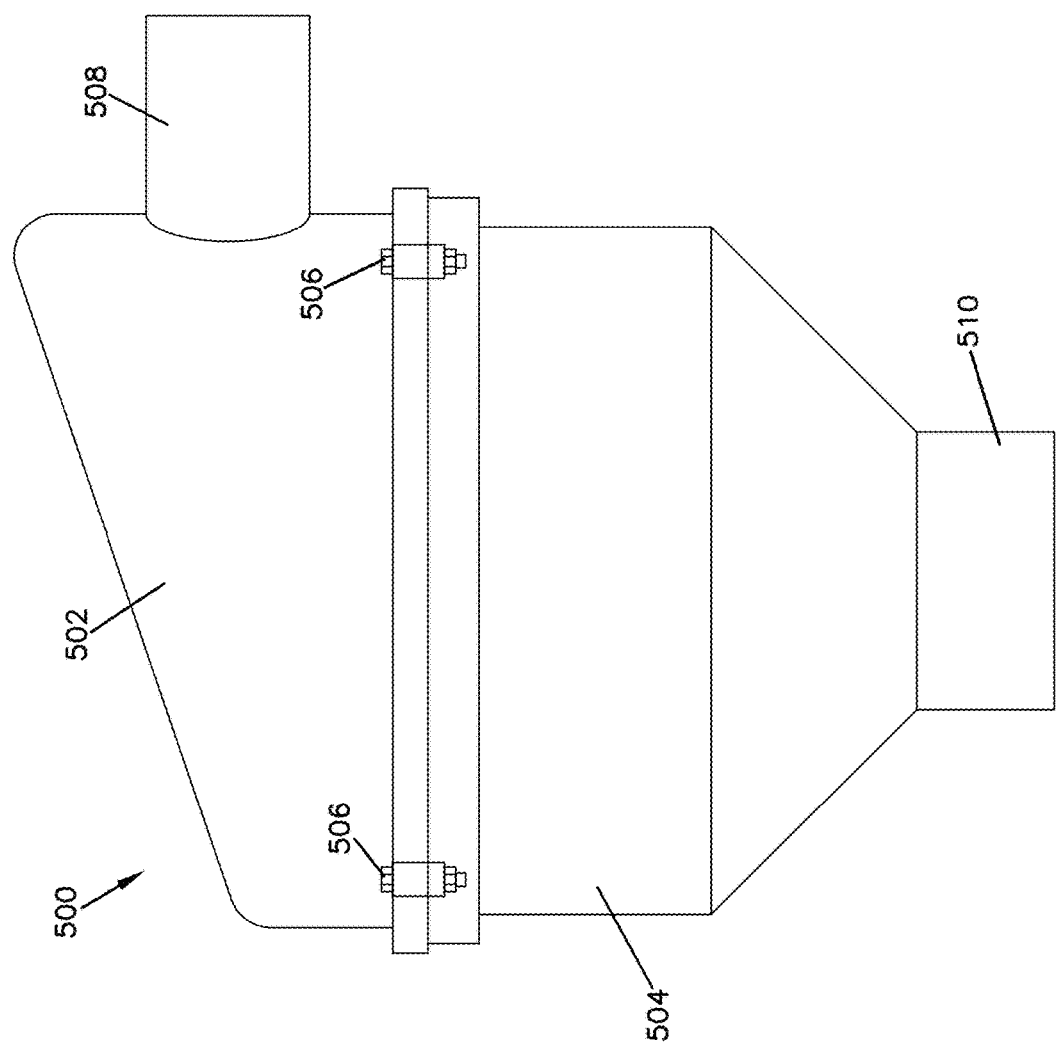
FIG. 24 is a side view of an air cleaner.

Now referring to FIG. 24 an exemplary air cleaner housing is depicted at reference number 500. The air cleaner housing 500 includes a first housing part 502 and a second housing part 504. Fasteners 506, in this case bolts, can be provided for holding the parts 502 and 504 together. In addition, the force holding the parts 502 and 504 together can act on the seal member of the filter element thereby creating an axially directed seal. In general, the air cleaner includes an air inlet 508 and an air outlet 510. In the air cleaner 500, the air must turn 90° inside the air cleaner 500. In addition, the air flow can be reversed, if desired. In that situation, the opening 510 becomes the inlet and opening 508 becomes the outlet.

Figure 25:
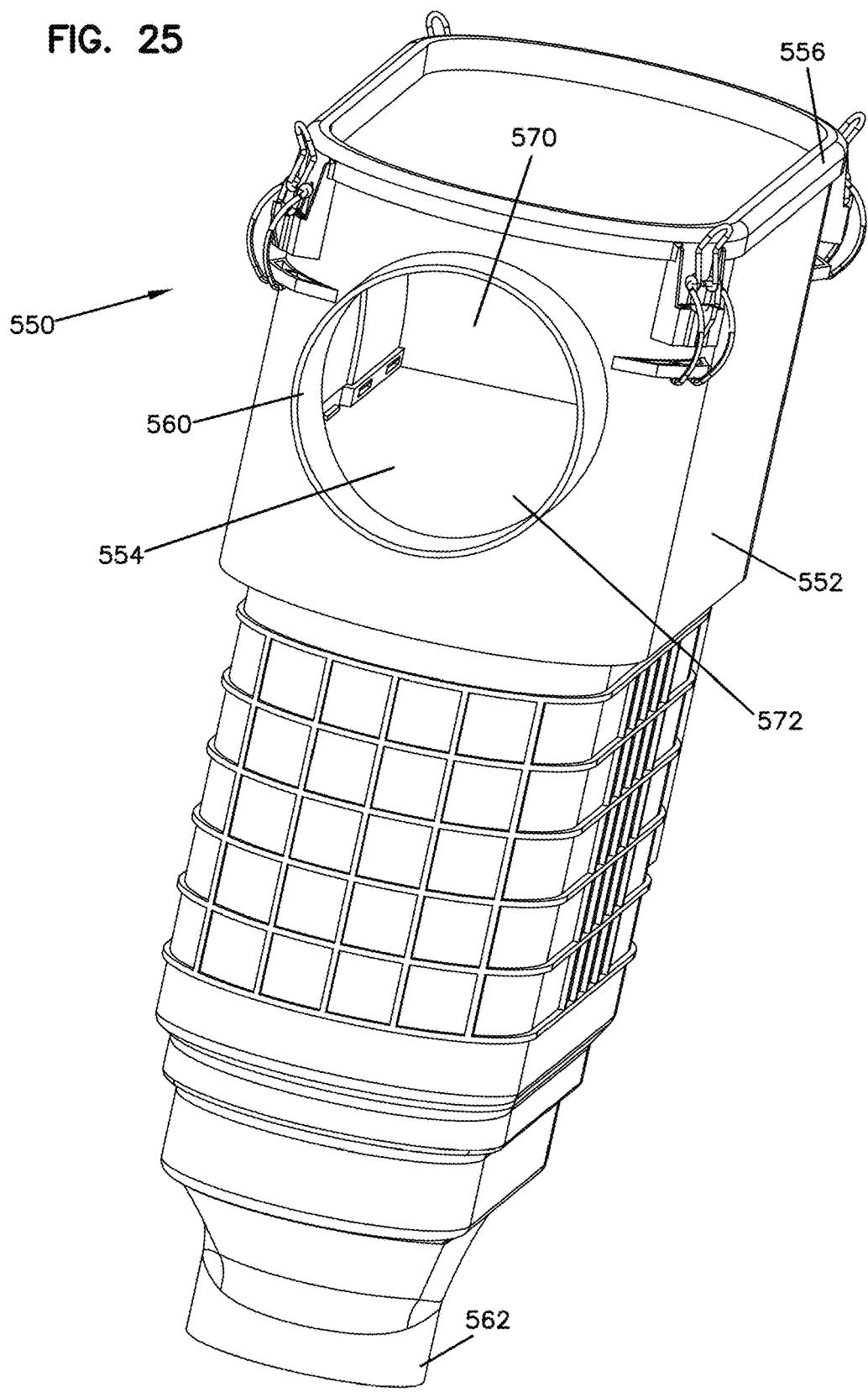
FIG. 25 is a perspective view of an air cleaner with the filter cartridge therein.

Now referring to FIGS. 25 and 26, an alternative air cleaner is illustrated at reference number 550. The air cleaner 550 is shown having a housing body 552, a filter cartridge 554, and a housing cover 556. In addition, the air cleaner 550 includes an air inlet 560 and an air outlet 562. The filter cartridge 552 includes an air deflector or fin 570 that can deflect air toward the media pack 572. In general, the filter cartridge 554 can be a filter cartridge according FIGS. 9-12. In addition, the filter cartridge seal member 580 can be provided so that it rests on the housing seal surface 582, and the cover filter cartridge engagement surface 584 can be provided so that it compresses the seal member 580 when the cover 556 is installed. Over center latches 586 can be provided to help hold the cover 556 in place on the housing 552.

According to the present disclosure, techniques and features for filter cartridges are characterized. Typically the filter cartridges are of the type that can be used in an air cleaner assembly, as a service part. A typical application would be for filtering combustion air directed to the intake of an internal combustion engine of a vehicle or other equipment.

In general terms, a filter cartridge is provided. The cartridge has first and second flow ends and comprises filter media, positioned to filter fluid (air) directed between the flow ends. A variety of media types are characterized, having media (flutes or pleat tips) extending between the first and second flow ends. The term "flutes" is meant to refer to pleats or other types of corrugations.

Example media types includes those which have a fluted sheet secured to a facing sheet, formed into a media pack. Such arrangements may be corrugated or may comprise a stack of individual strips of single faced media.

Other media types characterized are ones in which the cartridge has multiple, spaced, pleated media extensions extending between the first and second flow ends.

The first and second flow ends can comprise flow faces, i.e. faces of the cartridge into which, or from which, air flow occurs.

In general, the filter cartridge includes a seal arrangement. The seal arrangement may comprise, for example, a pinch seal arrangement. In general, the seal arrangement has a first axial housing engagement (seal) surface, i.e. (seal) a surface which is directed axially and which is configured to engage a housing surface, with sealing, in use. The first axial seal housing seal engagement surface includes a contoured axial surface section thereon, having at least a first housing engagement projection/recess member thereon.

In general terms, seal arrangements characterized herein include seal members that have first and second, opposite, axially directed surfaces, one of which is the first axial seal housing engagement surface. When the seal member is a pinch seal member, each of the opposite axial surfaces engages the housing, in a typical application. In some arrangements, the flexible lip member can be provided, with one surface that engages the housing and an opposite surface that engages a seal support on the cartridge.

A typical housing seal arrangement, or seal member, characterized herein has an outer peripheral, perimeter, edge or edge surface. That peripheral edge or peripheral perimeter edge surface is the edge or surface of the seal member that faces away from the media in extension around the cartridge.

As indicated previously, selected example arrangements are described in which the seal arrangement comprises a pinch seal arrangement having an outer peripheral edge surface and first and second, opposite, pinch seal engagement surfaces with one of the first and second, opposite, pinch seal (housing engagement) surfaces being the axial seal engagement surface with a contoured section thereon, having at least a first housing engagement projection/recess member therein. Certain examples are shown in which the opposite pinch seal housing engagement surface from the one with the first housing engagement projection/recess member is itself not contoured, for example in complete continuous peripheral extension around the media.

In typical arrangements, in which the housing seal arrangement comprises a molded-in-place seal member having first and second, opposite, pinch seal housing engagement surfaces, the surfaces are spaced apart at least 5 mm and not more than 50 mm.

In typical arrangements which include an optional peripheral perimeter edge projection/recess contour, typically that contour has a relief relative to adjacent portions of the edge, at least 1 mm and not more than 10 mm.

Typically when the peripheral perimeter edge projection/recess contour is present, any section of it extends over a peripheral perimeter distance of at least 5 mm, typically at least 10 mm.

As discussed herein above, the media can be provided with a plurality of shapes, including ones that have non-circular outer peripheries, such as oval peripheries or rectangular peripheries. In a typical arrangement, the outer periphery has at least one straight section extending over a distance of at least 40 mm.

Indeed, examples of this are shown in instances where the media has an oval perimeter with two opposite straight sides and two opposite curved ends; and, in the examples where the media has a rectangular perimeter. In a variety of examples depicted herein, a first flow end of the media is an inlet flow end and a seal arrangement is positioned adjacent to that inlet flow end, although it may be spaced therefrom slightly. Alternates are possible.

Example arrangements are depicted in which the first and second opposite flow ends are generally planar, and the seal arrangement is generally positioned in a plane parallel to one of the flow ends. Alternatives are possible.

The arrangements characterized herein are particularly convenient for application in cartridges in which the media has significant dimension or extension between the first and second flow ends. For example, on the order of at least 80 mm, usually at least 100 mm, often 150 mm or more, for example 200 mm or more.

Filter cartridge variations are characterized herein that include a vane or air deflector arrangement thereon. The vane or air deflector arrangement can help direct air onto the flow face of the media pack, and can help divide the air so that the air flowing onto the media pack is not too concentrated at one portion of the media pack. This air deflection can help achieve improved mass air flow. The vane or air deflector can also be considered a handle arrangement because it permits relatively convenient holding of the filter cartridge.

In some examples, the seal arrangement comprises seal member or resilient seal member which is a portion of a molded-in-place member, and the handle member is secured to a remainder of the cartridge by the molded-in-place member. To accomplish this, the handle member may be provided with a peripheral rim section, for example by which it is secured to the molded-in-place member. In certain example arrangements characterized herein, the seal arrangement includes an axial pinch seal having first and second, opposite, housing engagement surfaces; and, the cartridge is configured such that a pinch seal housing engagement surface is positioned on a portion of the pinch seal arrangement spaced from the media by receiver space. That receiver space can be configured to extend completely peripherally around the media, and can be configured to receive portion of a housing projection therein, between the engagement surface of the media, during installation.

In these examples, the radially inner surface of the axial pinch seal arrangement can be contoured, for example in extension toward the second pinch seal housing engagement surface. In an example characterized, a slanted section that slants away from the media as it extends toward the second pinch seal housing engagement surface is shown and described. It is noted that in certain examples characterized herein, the housing seal arrangement includes a portion molded directly to the filter media. When this is done, it will typically be adjacent a flow end, i.e. adjacent a first (typically in use, inlet) flow end.

In some examples characterized herein, the seal arrangement is positioned on a seal support, typically a rigid preform member. This can provide the seal arrangement with some support in use. In certain examples, the seal support is positioned on preform shell surrounding the media pack. However, whether or not a seal support is provided, preform shell can provide some advantage in protecting the media.

The preform shell, when used, can be provided with an end grid in extension across a flow end of the media. It can also include a receiver extending from that flow end to a location surrounded by the media.

In some arrangements, instead of molded-in-place, the seal arrangement can comprise a preform gasket member positioned around a filter media. An example of such gasket member is characterized, which includes a flexible seal or lip member positioned to flex toward or away from a pressure surface on a seal support. The particular example gasket is shown which has first and second lateral lips or flanges. In an example, one of the flanges or lips, in particular the one which engages the housing, is thicker than the first flange. A typical such preformed gasket member would comprise a type (thermoplastic elastomer).

As indicated above, example cartridge arrangements when the media pack has a non-circular outer perimeter are characterized. In many instances, they will be cross-sections that have a long dimension and a short dimension, with a ratio of the long dimension to the short dimension being at least 1.3:1, typically within the range of 1.3:1 to 5:1, inclusive, although alternatives are possible. Some examples are provided in range of ratios is within 1.5:1 to 3.5:1, inclusive.

IV. Other Features and Observations

Herein, general features usable in filter cartridges and air cleanser assemblies are described in terms of characterizations. They may be used independently of other features, or together with other features as deemed desirable for particular applications. In general accord with the present disclosure:

1. A filter cartridge comprising:
   (a) first and second opposite flow ends, wherein one of the first and second opposite flow ends comprises an inlet and the other of the first and second opposite flow ends comprises an outlet;
   (b) filter media positioned to filter fluid flow between the first and second opposite flow ends and having an outer periphery;
   (c) a shell arrangement comprising:
      (i) a shell body surrounding the outer periphery of the filter media and having a first end and a second end;
      (ii) a first seal support extending from the shell body first end in a direction away from the filter media; and
      (iii) a shell body filter media support extending from the shell body second end and supporting the filter media within the shell arrangement;
   (d) a ring arrangement comprising:
      (i) a ring body surrounding the outer periphery of the filter media and having a first end and second end;
      (ii) a ring body filter media support extending from the ring body first end and supporting the filter media within the ring arrangement;
      (iii) a second seal support extending from the ring body second end in a direction away from the filter media; and
   (e) a seal member molded onto the first seal support and the second seal support and holding the first seal support and the second seal support together.
2. A filter cartridge according to characterization 1 wherein:
   (a) the media extends over a distance of at least 80 mm in a direction between the first and second flow ends.
3. A filter cartridge according to any one of characterizations 1-2 wherein:
   (a) the media extends over a distance of at least 150 mm in a direction between the first and second flow ends.
4. A filter cartridge according to any one of characterizations 1-3 wherein:
   (a) the media extends over a distance of at least 180 mm in a direction between the first and second flow ends.
5. A filter cartridge according to any one of characterizations 1-4 wherein:
   (a) the first seal support comprises a radially extending flange having a plurality of openings therein.
6. A filter cartridge according to characterization 5 wherein:
   (a) the first seal support comprises a funnel portion between the shell body and the radially extending flange, and the plurality of openings extend into the funnel portion.
7. A filter cartridge according to any one of characterizations 1-6 wherein:
   (a) the second seal support comprises a plurality of projections extending into the plurality of openings.
8. A filter cartridge according to characterization 7 wherein:
   (a) the seal member is provided extending through the plurality of openings and around the plurality of projections.
9. A filter cartridge according to characterization 8 wherein:
   (a) the seal member adheres the shell arrangement and the ring arrangement to the filter media.
10. A filter cartridge according to any one of characterizations 1-8 wherein:
    (a) the shell body filter media support extends from one side of the shell body second end to the other side of the shell body second end.
11. A filter cartridge according to any one of characterizations 1-10 wherein:
    (a) the ring body filter media support comprises a plurality of projections extending from an inside surface of the ring body and located above the filter media.
12. A filter cartridge according to any one of characterizations 1-11 wherein:
    (a) the shell body comprises and inner surface having recesses therein for receiving a fin arrangement.
13. A filter cartridge according to characterization 12 further comprising:
    (a) a fin arrangement provided extending from an inner surface of the ring body.
14. A filter cartridge according to characterization 13 wherein:
    (a) the fin arrangement includes two side members and a curved extension located between the two side members and provided for directing air.
15. An air cleaner assembly comprising:
    (a) a housing having a first housing section and a second housing section; and,
    (b) a filter cartridge according to any one of characterizations 1-14 positioned within the housing.

There is no specific requirement that all air cleaner assemblies, components and features be applied with all of the characterizations provided herein, in order to obtain some advantage in accord with the present disclosure. The teachings are meant to be applicable in a variety of arrangements, including alternates to the ones depicted, and alternate to the particular combinations of features depicted herein.

What is claimed:
1. A filter cartridge comprising:
   (a) first and second opposite flow ends, wherein one of the first and second opposite flow ends comprises an inlet and the other of the first and second opposite flow ends comprises an outlet;
   (b) filter media positioned to filter fluid flow between the first and second opposite flow ends and having an outer periphery;
   (c) a shell arrangement comprising:
      (i) a shell body surrounding the outer periphery of the filter media and having a first end and a second end;
      (ii) a first seal support extending from the shell body first end in a direction away from the filter media; and
      (iii) a shell body filter media support extending from the shell body second end and supporting the filter media within the shell arrangement;
   (d) a ring arrangement comprising:
      (i) a ring body surrounding the outer periphery of the filter media and having a first end and second end;
      (ii) a ring body filter media support extending from the ring body first end and supporting the filter media within the ring arrangement;

(iii) a second seal support extending from the ring body second end in a direction away from the filter media; and
(e) a seal member molded onto the first seal support and the second seal support and holding the first seal support and the second seal support together, and wherein the seal member includes a seal surface extending around the filter media and constructed to form a seal with a housing.

2. A filter cartridge according to claim 1 wherein:
(a) the media extends over a distance of at least 80 mm in a direction between the first and second flow ends.

3. A filter cartridge according to claim 1 wherein:
(a) the media extends over a distance of at least 150 mm in a direction between the first and second flow ends.

4. A filter cartridge according to claim 1 wherein:
(a) the media extends over a distance of at least 180 mm in a direction between the first and second flow ends.

5. A filter cartridge according to claim 1 wherein:
(a) the first seal support comprises a radially extending flange having a plurality of openings therein.

6. A filter cartridge according to claim 5 wherein:
(a) the first seal support comprises a funnel portion between the shell body and the radially extending flange, and the plurality of openings extend into the funnel portion.

7. A filter cartridge according to claim 5 wherein:
(a) the second seal support comprises a plurality of projections extending into the plurality of openings.

8. A filter cartridge according to claim 7 wherein:
(a) the seal member is provided extending through the plurality of openings and around the plurality of projections.

9. A filter cartridge according to claim 8 wherein:
(a) the seal member adheres the shell arrangement and the ring arrangement to the filter media.

10. A filter cartridge according to claim 1 wherein:
(a) the shell body filter media support extends from one side of the shell body second end to the other side of the shell body second end.

11. A filter cartridge according to claim 1 wherein:
(a) the ring body filter media support comprises a plurality of projections extending from an inside surface of the ring body and located above the filter media.

12. A filter cartridge according to claim 1 wherein:
(a) the shell body comprises and inner surface having recesses therein for receiving a fin arrangement.

13. A filter cartridge according to claim 12 further comprising:
(a) a fin arrangement provided extending from an inner surface of the ring body.

14. A filter cartridge according to claim 13 wherein:
(a) the fin arrangement includes two side members and a curved extension located between the two side members and provided for directing air.

15. A filter cartridge according to claim 1 wherein:
(a) the seal member has first and second, opposite, pinch surfaces, and one of the pinch surfaces comprises the seal surface extending around the filter media.

16. A filter cartridge according to claim 15, wherein:
(a) the seal surface extending around the filter media comprises an axial sealing surface.

17. A filter cartridge according to claim 1 wherein:
(a) the seal surface extending around the filter media is located radially outward from both the shell body and the ring body.

18. A filter cartridge comprising:
(a) first and second opposite flow ends, wherein one of the first and second opposite flow ends comprises an inlet and the other of the first and second opposite flow ends comprises an outlet;
(b) filter media positioned to filter fluid flow between the first and second opposite flow ends and having an outer periphery;
(c) a shell arrangement comprising:
    (i) a shell body surrounding the outer periphery of the filter media and having a first end and a second end;
    (ii) a first seal support extending from the shell body first end in a direction away from the filter media and comprising a radially extending flange having a plurality of openings therein; and
    (iii) a shell body filter media support extending from the shell body second end and supporting the filter media within the shell arrangement;
(d) a ring arrangement comprising:
    (i) a ring body surrounding the outer periphery of the filter media and having a first end and second end;
    (ii) a ring body filter media support extending from the ring body first end and supporting the filter media within the ring arrangement;
    (iii) a second seal support extending from the ring body second end in a direction away from the filter media; and
(e) a seal member molded onto the first seal support and the second seal support and holding the first seal support and the second seal support together.

19. A filter cartridge according to claim 18 wherein:
(a) the first seal support comprises a funnel portion between the shell body and the radially extending flange, and the plurality of openings extend into the funnel portion.

20. A filter cartridge according to claim 18 wherein:
(a) the second seal support comprises a plurality of projections extending into the plurality of openings.

21. A filter cartridge according to claim 20 wherein:
(a) the seal member is provided extending through the plurality of openings and around the plurality of projections.

22. A filter cartridge according to claim 21 wherein:
(a) the seal member adheres the shell arrangement and the ring arrangement to the filter media.

23. A filter cartridge according to claim 18 wherein:
(a) the shell body filter media support extends from one side of the shell body second end to the other side of the shell body second end.

24. A filter cartridge according to claim 18 wherein:
(a) the ring body filter media support comprises a plurality of projections extending from an inside surface of the ring body and located above the filter media.

25. A filter cartridge according to claim 18 wherein:
(a) the seal member has first and second, opposite, pinch surfaces, and one of the pinch surfaces comprises the seal surface extending around the filter media.

26. A filter cartridge according to claim 25, wherein:
(a) the seal surface extending around the filter media forms an axial sealing surface.

27. An air cleaner assembly comprising:
(a) a housing having a first housing section and a second housing section; and,
(b) a filter cartridge positioned within the housing comprising:
    (i) first and second opposite flow ends, wherein one of the first and second opposite flow ends comprises an inlet and the other of the first and second opposite flow ends comprises an outlet;

(ii) filter media positioned to filter fluid flow between the first and second opposite flow ends and having an outer periphery;

(iii) a shell arrangement comprising:
  (A) a shell body surrounding the outer periphery of the filter media and having a first end and a second end;
  (B) a first seal support extending from the shell body first end in a direction away from the filter media; and
  (C) a shell body filter media support extending from the shell body second end and supporting the filter media within the shell arrangement;

(iv) a ring arrangement comprising:
  (A) a ring body surrounding the outer periphery of the filter media and having a first end and second end;
  (B) a ring body filter media support extending from the ring body first end and supporting the filter media within the ring arrangement;
  (C) a second seal support extending from the ring body second end in a direction away from the filter media; and (v) a seal member molded onto the first seal support and the second seal support and holding the first seal support and the second seal support together, and wherein the seal member includes a seal surface extending around the filter media and forming a seal with the housing.

28. The air cleaner assembly according to claim 27 wherein:

(a) the seal surface extending around the filter media forms an axial sealing surface with the housing.

* * * * *